Dec. 29, 1970  C. G. SVALA ET AL  3,550,288
OPERATOR TRAINING SYSTEM
Filed March 12, 1969  17 Sheets-Sheet 4

INVENTOR
CARL GUNNAR SVALA
CHUNG-PAH XAVIER LEE

BY

ATTORNEY

INVENTOR
CARL GUNNAR SVALA
CHUNG-PAH XAVIER LEE

ATTORNEY

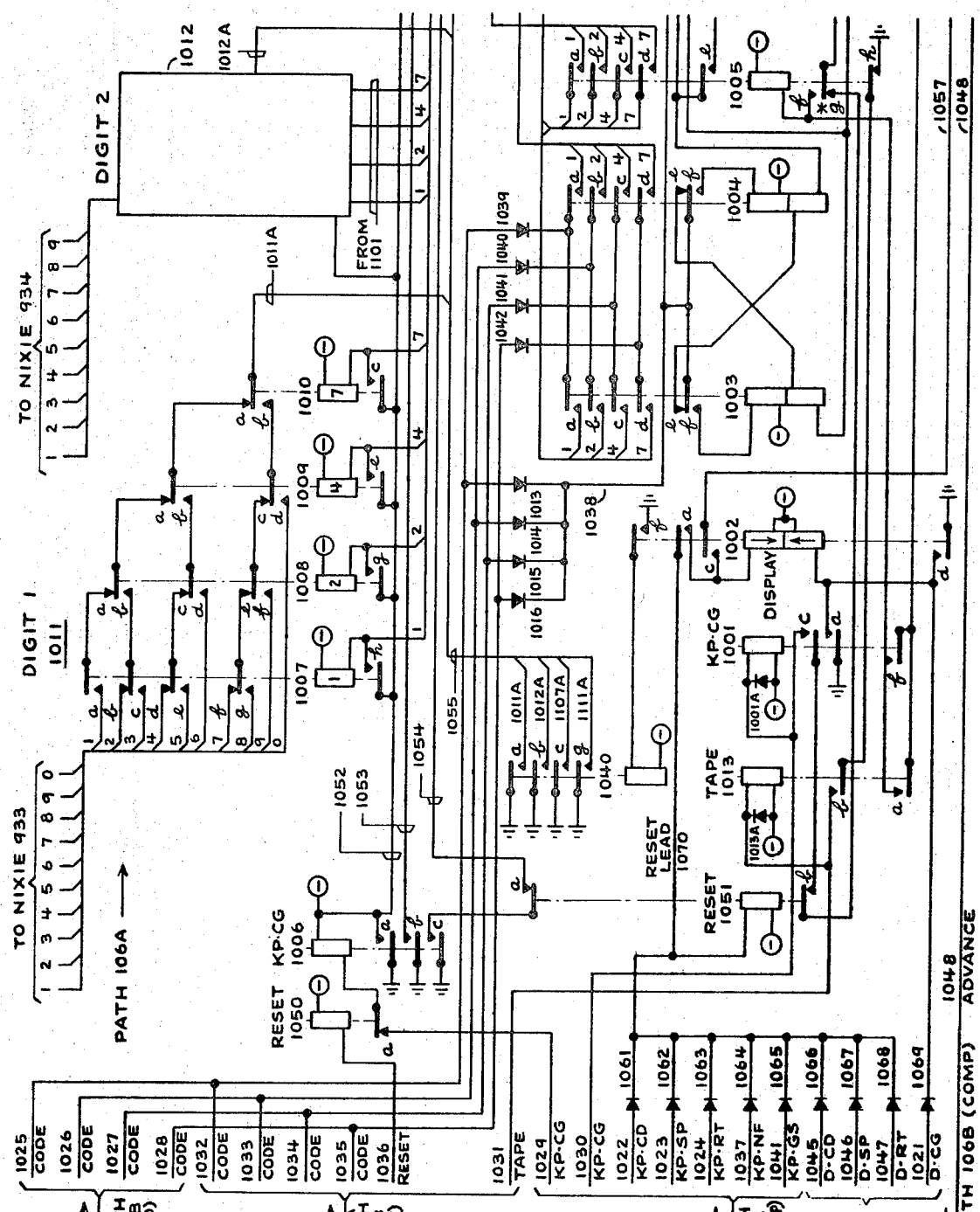

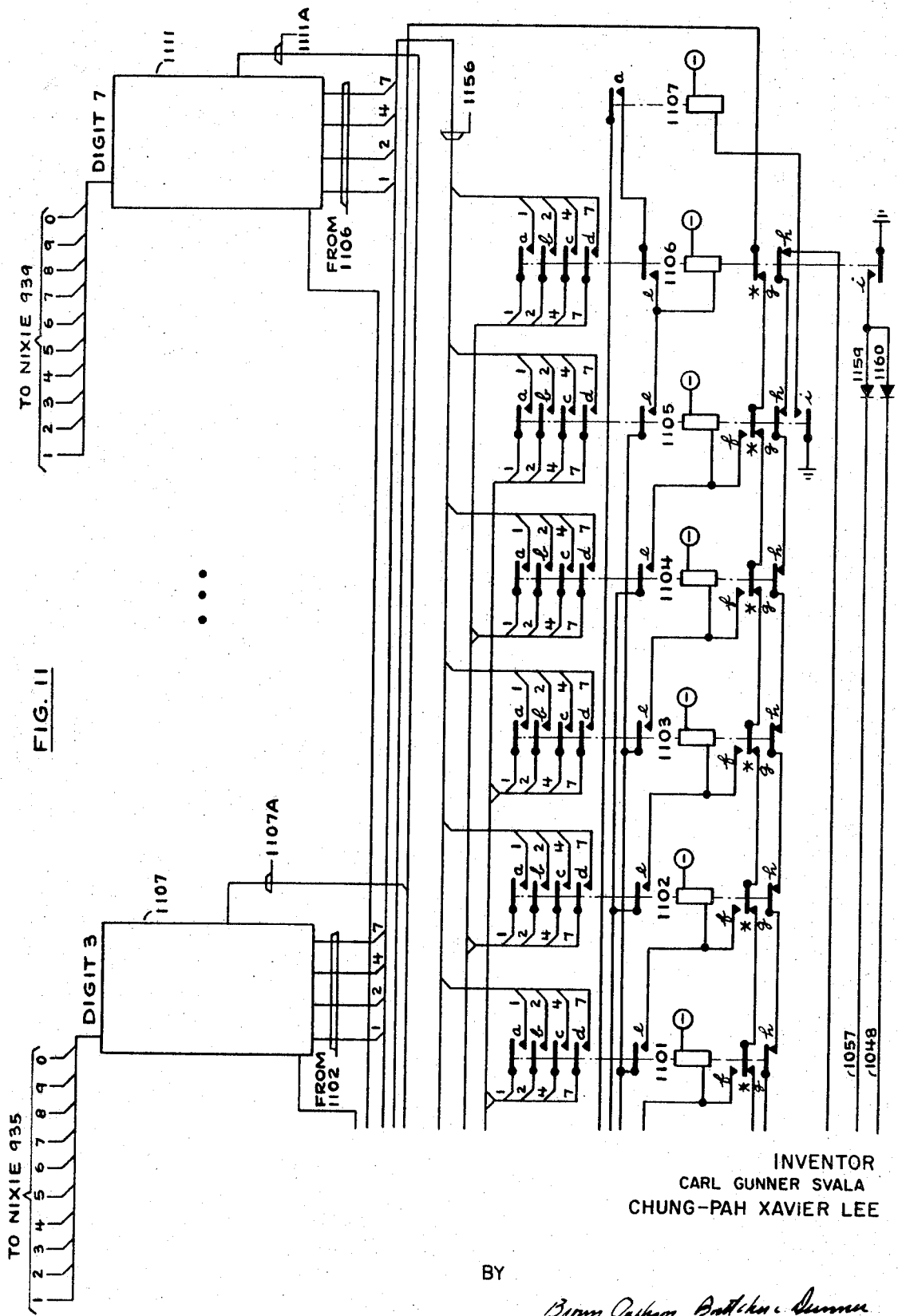

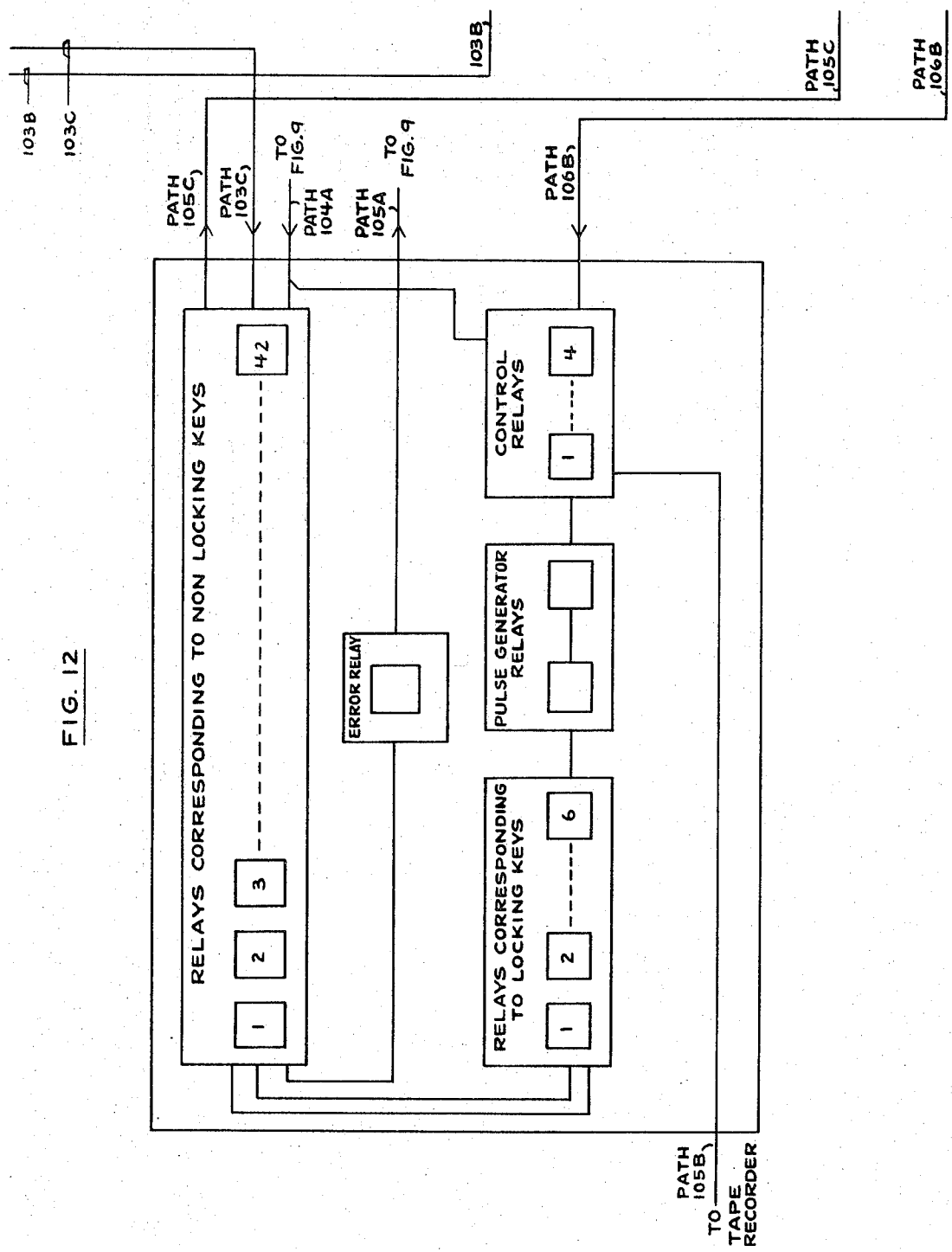

Dec. 29, 1970   C. G. SVALA ET AL   3,550,288
OPERATOR TRAINING SYSTEM
Filed March 12, 1969   17 Sheets-Sheet 15
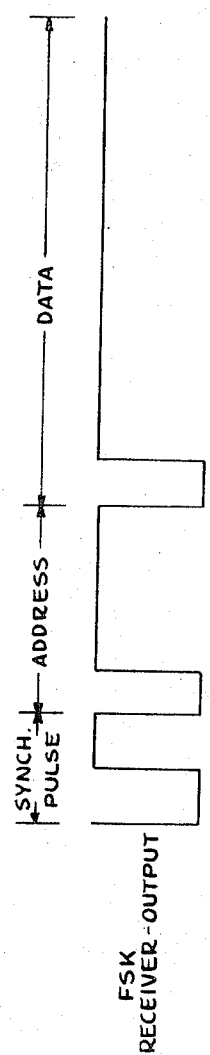
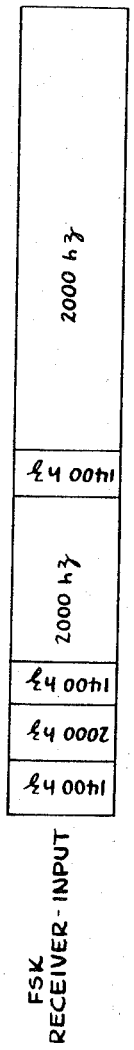
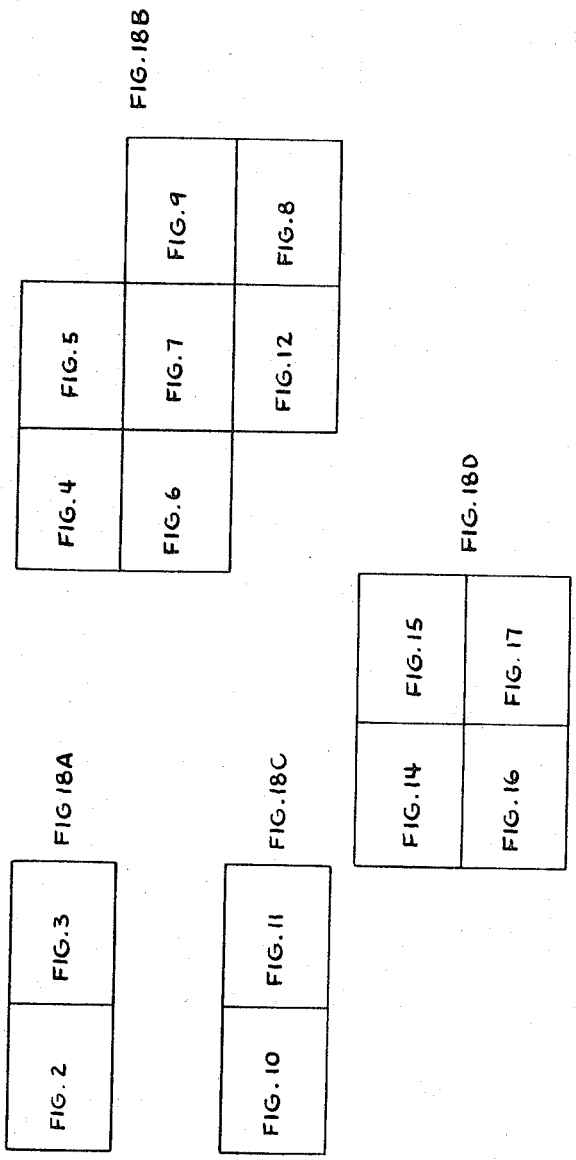
INVENTOR
CARL GUNNAR SVALA
CHUNG-PAH XAVIER LEE
BY
ATTORNEY Dec. 29, 1970     C. G. SVALA ET AL     3,550,288

OPERATOR TRAINING SYSTEM

Filed March 12, 1969     17 Sheets-Sheet 14

INVENTOR
CARL GUNNAR SVALA
CHUNG-PAH XAVIER LEE

BY

ATTORNEY

INVENTOR
CARL GUNNAR SVALA
CHUNG-PAH XAVIER LEE

ATTORNEY

United States Patent Office 3,550,288
Patented Dec. 29, 1970

3,550,288
OPERATOR TRAINING SYSTEM
Carl Gunnar Svala and Chung-Pah Xavier Lee, Galion, Ohio, assignors to North Electric Company, Galion, Ohio, a corporation of Ohio
Filed Mar. 12, 1969, Ser. No. 806,615
Int. Cl. G09b 5/00
U.S. Cl. 35—8                                     18 Claims

ABSTRACT OF THE DISCLOSURE

A training system for training telephone operators in handling the incoming calls at a toll service desk by selectively operating various keys on the toll service desk, wherein the training program is recorded on an audio tape having two channels (one of the channels having inaudible commands in a frequency shift code to the equipment and the other channel having a recorded voice to simulate a real subscriber or distant operator). The recorded program is advanced step by step, and the trainee's response to a particular situation is compared against the desired response; if the trainee's response matches the desired response, the program moves to its next step.

CROSS REFERENCE TO RELATED APPLICATION

A toll service desk which may be used with the training system of the present disclosure is shown in the copending application which was filed on even date herewith by Don E. Halbedel, Benjamin J. Bagwell, James L. Horning, Erik A. Lissakers, Joseph H. Long, Cameron C. Schweitzer, and Jack E. Callender, deceased, and assigned to the assignee of the present application.

BACKGROUND OF THE INVENTION

Field of the invention

The invention relates to the subject matter found in Class 35, Subclass 8.

Description of prior art

One known training system for training toll service operators employs teletypewriter paper tape for programming circuit operations and a magnetic tape for tone and speech outputs. This, of course, requires a synchronization between the paper tape and the magnetic tape which is not very desirable.

In another such training system, the tape recording contains a 100 c.p.s. tone which is pulsed to various two digit codes. The 100 c.p.s. tone is filtered out so that it is inaudible to the trainees but is fed to a tone detector which translates the tone pulses to dial pulses which are in turn fed to a matrix. Each matrix crosspoint corresponds to a two-digit code which selectively operate the lamps and keys on the board and also operates certain program relays. However, due to a limited number of two digit codes and the inherent slow speed by which a two-digit code can be programmed on the tape, the system has the disadvantage of slow speed and inflexibility. Also, such training system requires certain dedicated toll service positions, and cannot be plugged into a regular toll service desk for training purposes.

SUMMARY OF INVENTION

The present invention comprises a program tape which has exact sequences of a call recorded thereon along with required voice simulations, the call sequence being recorded in frequency shift code. Every call sequence is written in segments, each segment being comprised of eighteen bit words having address and data.

The tape is played on a magnetic tape recorder through a FSK (frequency shift keying) receiver, and the words recorded in FSK code are converted by the receiver to binary logic levels. The output of the FSK receiver is thus comprised of eighteen bit words whose data bits are routed to various relay or lamp drivers depending upon the address contained therein. The lamp drivers light certain lamps on the training board while the relay drivers operate certain relays in a comparator unit. Lighting of the lamps gives an indication to the trainee of the type of incoming calls, and the trainee is required to depress certain keys on the training board which are considered responsive to the condition represented by the illuminated lamps. The information represented by the depressed keys is compared in the comparator unit with the information represented by the relays which are operated by the program. If the trainee pressed the right keys, the program is advanced another step; however, if a wrong key was depressed, an error lamp is lighted on her desk, and the program does not proceed any further until the mistake is rectified by depressing the correct key.

It is therefore an object of the invention to provide a new training system for toll desk operators which is more efficient, more flexible, faster and more expeditious in training operators than the training systems of the prior art.

As set forth in the above-identified copending application, the training system of this disclosure may be plugged into the toll service desks actually used to service subscribers. With such connection the toll service desk is taken out of use and operates with the present system to provide a training facility.

BRIEF DESCRIPTION OF THE DRAWINGS

FIGS. 4, 5, 6, 7, 8, 9, and 12, when assembled according to the scheme of FIG. 18B, disclose the manner in which the data bits are used to selectively enable a relay or a lamp driver, and the manner in which outputs of the various relay and lamp drivers are fed to the training board (FIG. 9), the register unit (FIG. 8) and the comparator unit (FIG. 12);

FIGS. 10 and 11, when assembled as shown in FIG. 18C, show the details of a calling number register which is typical of the six registers in the register unit;

FIG. 13 shows the input and output of a frequency shift keying receiver;

FIGS. 18A–18D set forth the manner in which the various figures are to be assembled.

DESCRIPTION OF THE PREFERRED EMBODIMENTS

Figure 1:
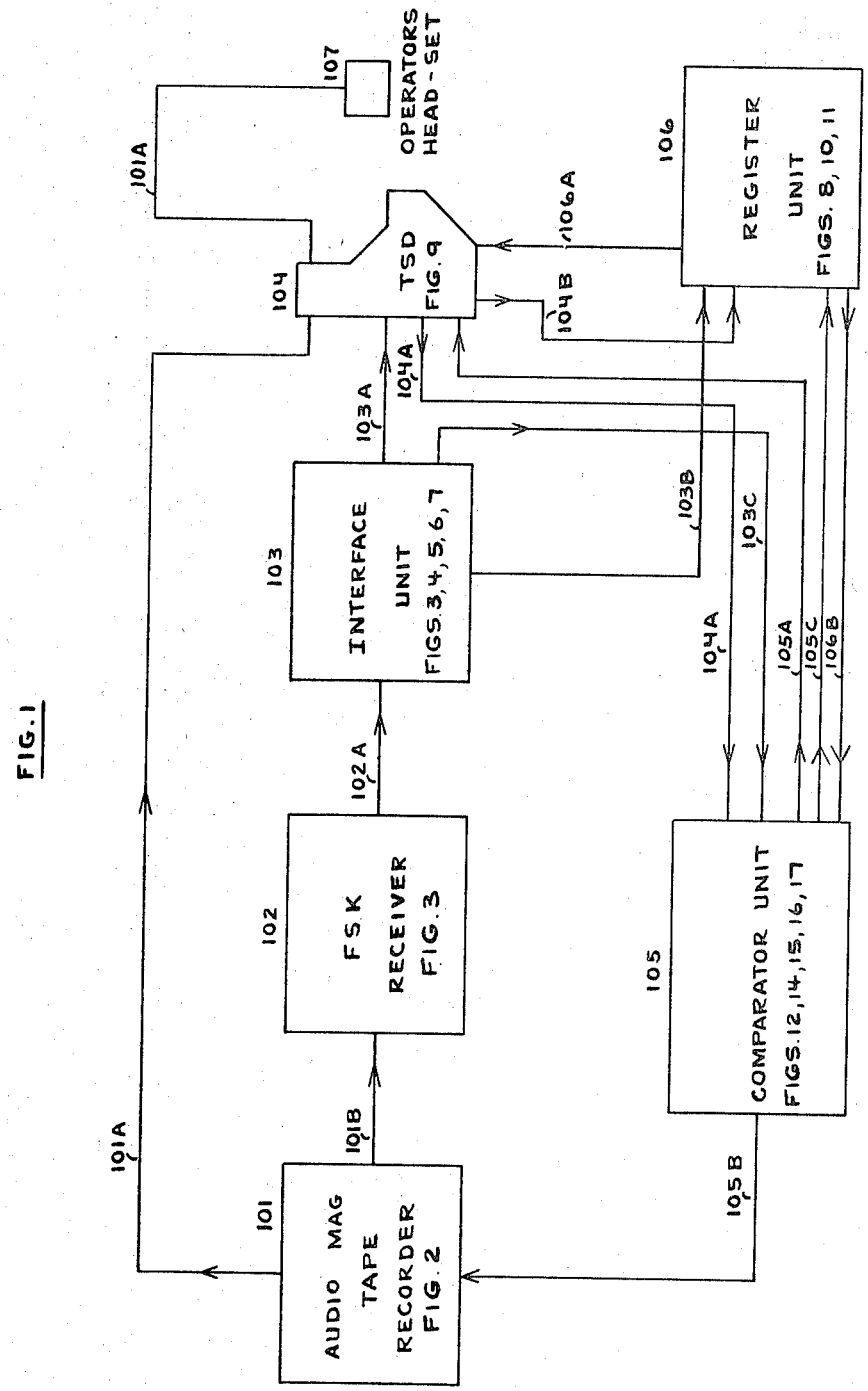
FIG. 1 is a schematic block diagram of the system.

Referring to FIG. 1, the entire training unit is shown to include an audio magnetic tape recorder 101, a frequency shift keying receiver 102, an interface unit 103, a toll service desk 104, a comparator unit 105, a register unit 106, and an operator's headset 107 interconnected by paths as shown. The training program is recorded on a magnetic tape using frequency shift keying (FSK). The tape has two channels; one channel (program channel) has the actual program in segments while the other channel (audio channel) has audio messages which are used to simulate an actual call. Each segment of program consists of a number of eighteen bit words. A synchronizing (sync) pulse precedes each eighteen bit word and indicates the start of a new word. The total duration of the sync pulse is three bit times, with 1½ bit times at a logic 1 followed by 1½ bit times at a logic 0. Following the sync pulse is a six bit address with the least significant bit first and twelve bits for data. A logic 0 on the tape is represented by the presence of 2000 Hz. for 1.67 ms. while a logic 1 is represented by 1400 Hz. for 1.67 ms. These two frequencies thus generate a sequence of 1's and 0's on the program channel which correspond to the address and data of the word to be written.

An FSK receiver, such as 102, receives the frequencies from the tape recorded 101 over path 101B and outputs digital signals over lead 102A to the interface unit. The functioning of an FSK receiver is well known in the art and will not be discussed in any detail hereinafter.

The interface unit 103 is shown in FIGS. 3, 4, 5, 6, and 7 and is described more fully hereinafter. Briefly, incoming words over lead 102A are tested for a good sync, and with the help of a counter, the address bits are put into an address shift register, such as 335 (FIG. 3) comprising six flip-flops and the data bits are put into a data shift register, such as 334 (FIG. 3) comprising twelve flip-flops. The outputs of the various flip-flops of the address register 335 are strapped in different combinations to the inputs of NAND gates, such as 410, etc. (FIG. 4) which control the application of a clock to correspond registers, such as 1–4. If an incoming address provided over path 301B (FIG. 3) by the FSK receiver to the address shift register 335 corresponds to the address for which a particular gate, such as 401, is strapped, the gate 401 applies a clock pulse to the flip-flops of its interconnected register 1, thereby enabling the register 1 to receive data from the data register 334.

Registers, such as 401 (FIG. 4) have twelve flip-flops and the outputs of these flip-flops are strapped to various relay drivers, such as 501. Register 1 (FIG. 4) is shown in detail and registers 2 through 4, which are similar to register 1, are shown as captioned boxes. The outputs of registers 5 through 13 are strapped to lamp drivers, such as 505, which over paths such as 411B or path 103A drive the lamps on a TSD board. The output of the various flip-flops of the registers 14 through 19 (FIG. 6) are also strapped to relay drivers, such as 700. The manner in which the various registers and the relay or lamp drivers function will be described in detail hereinafter.

Figure 9:
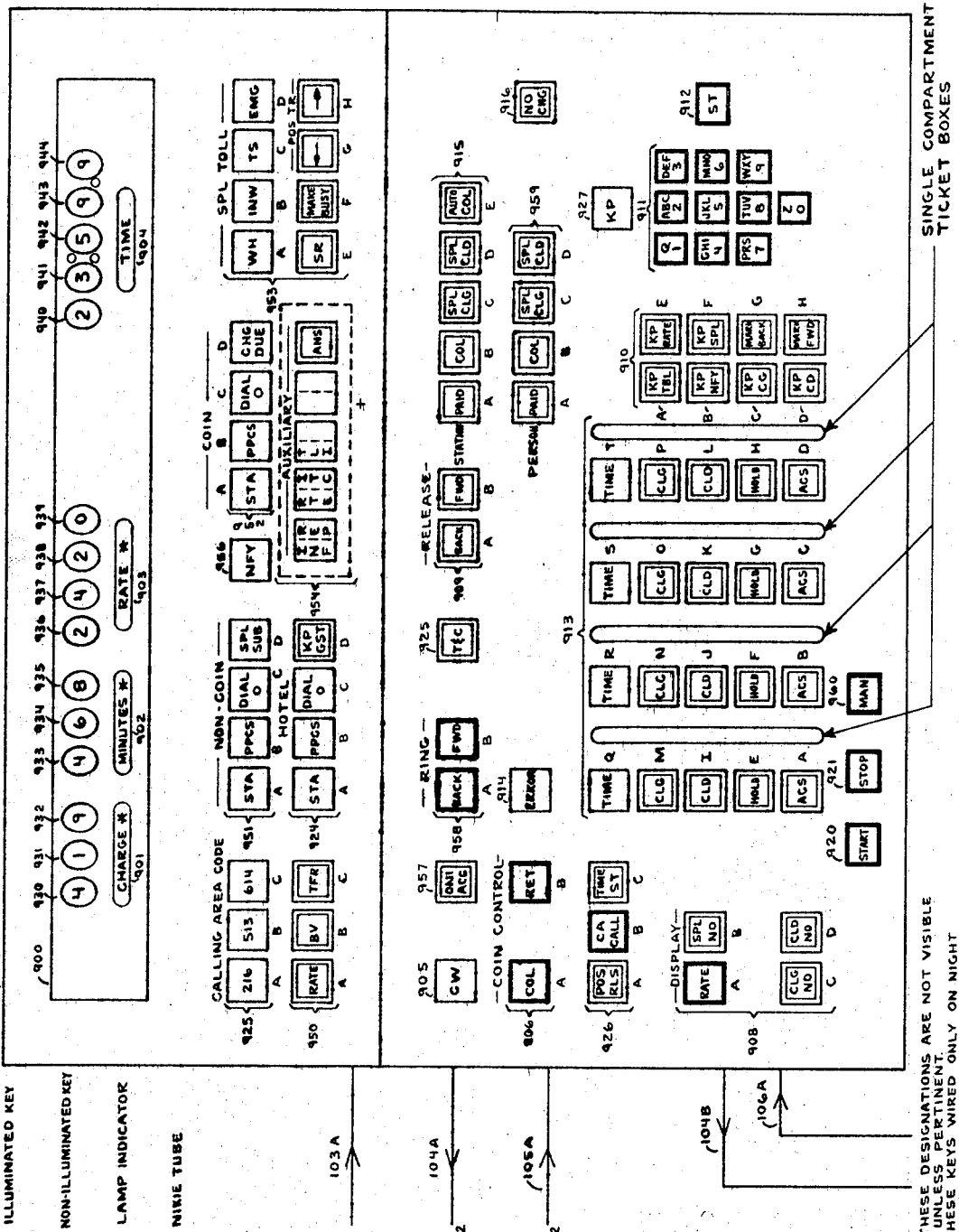

The output of the relay drivers in group 501 (twelve of which are shown in group 501 which corresponds to registers 1 through 4) is fed over paths 103B and 401B to a comparator unit, such as 105. The outputs of the lamp drivers in group 505 (twelve of which are shown in group 505 which corresponds to registers 5 through 12) is fed over path 411B and 103A to light lamps on the TSD board 104 (FIG. 9). The outputs of the relay drivers (five of which are shown in group 710 (FIG. 7) are connected over path 700A, 103B to drive specified relays in register unit 106 thereby storing a number in the specified registers.

The selective lighting of the different lamps on the TSD board indicates to the operator (under training) the type of incoming call which is being simulated, i.e., whether it is station-to-station, person-to-person, etc. The operator then presses certain keys on the TSD board which are to be operated whenever the condition indicated by the lamp exists. The information as to which key is pressed is fed over path 104A to the comparator unit 105. This information is compared with the information which was previously stored in the comparator unit 105 by the operation of certain relays (to be described) through the interface unit. If the operator has pressed the correct key, a signal is given by the comparator unit 105 over path 105B to tape recorder 101 and the tape is advanced to the next step in the program. However, if the operator pressed the wrong key the advance signal is not given to the tape recorder 101, and instead an error signal is provided over path 105A to the TSD board (FIG. 9) to light up an error lamp. The error lamp remains lighted until the operator depresses the correct key to thereby cause the tape to advance to the next step in the recorded program.

Register unit 106 (FIG. 8) stores the various information, such as the calling or the called number, the rate, etc. The operator may selectively request display on the TSD board (FIG. 9) of the information stored in the various registers of the register unit 106 (FIG. 8) by pressing a corresponding display pushbutton.

A brief résumé of the physical layout of the training keyboard and lamp display as shown in FIG. 9 at this time will simplify the detailed study of the present invention which appears later herein.

The TSD training board as shown in FIG. 9 provides the operator with displays of the information set which is required to supervise all types of calls normally received at the operator's position, and provides the keys which are used by the operator in controlling the connection, as well as the ancillary equipment required for supervision and billing purposes. The displays necessary for training the operator for a particular type of call are provided by the program on the tape through FSK receiver 102 and interface unit 103 in the manner described above.

The identification and functions of various keys and lamps are described in detail as follows:

The call control equipment consists of (1) a digital display; (2) lamps; (3) pushbutton keys; (4) alternate action pushbutton keys; (5) keys such as noted in (3) and (4) which also contain (internally) a lamp or lamps.

The abbreviations used for these various combinations are as follows:

| Item | Abbreviation |
|---|---|
| Digital Display | (DD) |
| Lamp | (L) |
| Push Key | (K) |
| Alternate Action Push Key | (AK) |
| Push Key With Lamp | (KL) |
| Alternate Action Push Key With Lamp | (AKL) |

| Identification number | Item or designation | Description and/or function |
|---|---|---|
| 901 | Digital Display (DD) (3 digits) | Used to display the following digital information as the equipment or operator may dictate:<br>a. NPA code (if available) (area code).<br>b. First three digits of a credit card number.<br>c. The "hour" connect time (tens and units) of a flashing recall.<br>d. "Charge" due on a coin call (when so equipped). |
| 902 | Digital Display (DD) (3 digits) | Used to display the following digital information as the equipment or operator may dictate:<br>a. Office code (either calling, called or third number).<br>b. Second set of 3 digits of a credit card number.<br>c. The minutes "connect" time (tens, units and tenth of minute) on a flashing recall.<br>d. The initial time interval requested ("3, 4 or 5" minutes) on a notify call or the elapsed time (max. 10 minutes), subsequent to the initial period on a coin call. |
| 903 | Digital Display (DD) (4 digits) | Used to display the following digital information as the equipment or operator may dictate:<br>a. Four digit station number (either calling, called or third number address).<br>b. The last four digits of a credit card number.<br>c. A three digit "Rate" or "Rate Code" when associated with a coin call. (The description "RATE" will also be lighted.) |
| 904 | Digital Display (DD) (5 digits) | A 24 hour clock indicating time in hours (tens and units), minutes (tens and units) and tenth of minutes (units) respectively. |

See footnotes at end of tables.

| Identification number | Item or designation | Description and/or function |
|---|---|---|
| 925 | Calling Area Code Lamps (3) (L) | These lamps, when lighted, indicate the area code of the calling subscriber. The left lamp indicates the home NPA. The center and right lamp will indicate the foreign NPA of offices served by the TSD, as required. |
| 950-A | Rate (AKL) | Operation of the RATE key initiates a call signal to the rate operator. The lamp will flash at 120 IPM until answered by the rate operator; at which time, the lamp becomes steady. After receiving the information from the rate operator, the TSD operator will reoperate the RATE key to release the connection at which time the lamp will go dark. |
| 950-B | BV (AKL) | Operation of the BV key initiates a call signal for a "Busy Verification" trunk. The lamp will flash at 120 IPM until a trunk is seized at which time the lamp will go steady. During the time the operator is connected to the "BV" trunk, her telephone circuit will be automatically "split" from the subscriber's loop circuit. Release of the "BV" trunk is accomplished by re-operation of the "BV" key at which time the lamp will go dark. |
| 950-C | TFR (KL) | Transfer call to a "prime" position. Operation of the TFR key lights the TFR lamp. The call is directed to a "prime" position and will appear on that position. The original operator can release from the loop and the "prime" operator will complete the call. |
| 952 | Non-Coin | ("Kinds of Call" indication for calls from non-coin stations.) |
| 951-A | STA (L) | Indicates a station-to-station call. "1"+7 or 10 digit called number. Operator must request and "key" calling number. |
| 951-B | PPCS (L) | Indicates a person-to-person, collect, or special information call. "0"+7 or 10 digit called number. Operator supervises the establishment of the connection as directed by the originating subscriber. Class-type information must be "keyed." |
| 951-C | DIAL 0 (L) | Indicates the subscriber has dialed 0 only. The operator must "key" *all* information to automatically ticket the call. |
| 951-D | SPL SUB (L) | Indicates the call has originated from a special subscriber (such as a mobile station). This lamp lights together with one of the previously described lamps and indicates that the calling number must be identified and "keyed." |
| 924 | Hotel | "Kind of Call" lamps for traffic from PBX's which have automatic "time and charge" marking and require identification of the calling station. |
| 924-A | STA (L) | Station-to-station call. Access Code +7 +1 or 10 digit called number. |
| 924-B | PPCS (L) | Person-to-person, collect or special information Access Code +0 +7 or 10 digit called number. |
| 294-C | DIAL 0 (L) | The subscriber has dialed 0 only. The operator must "key" all information to automatically ticket the call. |
| 924-D | KP GST (KL) | Key pulse guest number. *This is a lamp and key.* A lighted KP Guest lamp indicated that the guest (ext., dept.) number is missing. Operation of the key makes the operator's keyset functional so that a four digit number (representing the room number, extension number or department number) can be "keyed." If the number given consists of less than four digits, the operator will prefix the number with sufficient zeros to satisfy the four digit requirements. |
| 956 | NFY (L) | Lamp lights (red) to notify the operator at the end of the initial period on a coin call or at the end of the initial period (3, 4, or 5 minute) when requested on a non-coin call. |
| 952 | Coin | ("Kind of call" indication for calls from coin stations.) |
| 952-A | STA (L) | Indicates a station-to-station call. "1"+7 or 10 digit called number. Operator must determine initial period and secure initial deposit. Operator also "keys" three digit rate. |
| 952-B | PPCS (L) | Indicates a person-to-person, collect, or special information call. "0" +7 or 10 digit called number. Operator supervises the establishment of the connection as directed by the originating subscriber. A call timer may be connected. |
| 952-C | DIAL 0 (L) | Indicates the subscriber has dialed "0" *only*. The operator must "key" *all* information to automatically ticket the call. |
| 902-D | CHG DUE (L) | Charges due at the end of 10 minute overtime period or at the end of conversation during an overtime period. The rate and elapsed time are displayed. Operator collects. |
| 954 | Auxiliary | ("Kind of Call" indication keys and lamps equipped only on certain "Prime" positions. Positions so equipped have the ability to function as information or special service desks during periods of low traffic when the normal auxiliary service positions may not be manned.) |
| 953 | SPL TOLL | ("Kind of Call" indications for *special* toll traffic.) |
| 953-A | WH (L) | "We Have" or "TX" call. Because the called party at the distant office could not be reached on the original attempt, he (the called party) is returning the call by asking for "Operator ____." The operator obtains the called number, the name and number of the (original) calling subscriber and operates the "MARK BACK" key. This enables the automatic equipment to set up a connection to the original calling subscriber. |
| 953-B | INW (L) | Inward assistance given to a distant operator. The call is completed on a no-charge basis. If the call is collect to a coin station, a coin timer is connected and the disposal of coins is supervised. |
| 953-C | TS (L) | Call has originated from a common battery Toll Station. Operator must "key" all information to automatically ticket call. |
| 953-D | EMG (L) | Emergency—no use has been assigned to this lamp at the present time. |
| 953-E | SR (AKL) | Two-way tie line to supervisor's turret. Operation of key causes lamp to flash at 120 IPM. Answer (by the supervisor) causes the lamp to become steady. An incoming signal (from the supervisor) is also indicated by a flashing SR lamp. The called operator answers by depressing the SR key, at which time the lamp becomes steady. The large red "request assistance" lamp (above the ticket compartment—A1) will flash, become steady or dark in conjunction with the SR lamp. |
| 953-F | MAKE BUSY (AKL) | Make (position) busy. The red MAKE BUSY lamp lights when the key is operated. The MAKE BUSY key should be operated before the position is released from a loop if it is desired to "busy" the position to incoming traffic. Reoperation of the MAKE BUSY key releases the key. MAKE BUSY lamp goes dark. |
| 953-G | (AKL) | Position transfer left. Transfers the operator's headset circuit to the position on the left and lights the red lamp in the key. |

See footnotes at end of table.

| Identification number | Item or designation | Description and/or function |
|---|---|---|
| 953-H | (AKL) | Position transfer right. Transfers the operator's headset circuit to the position on the right and lights the red lamp in the key. The above keys allow the operator to dispose of calls left on loops on the position to the right or to the left when that position is vacated. Keys on the vacated position must be used to complete the calls. New calls will not appear at either position while the POS TR key is operated. The key is again operated to release the transfer condition. |
| 905 | CW (L) | Call Waiting. This lamp indicates that one (or more) call, of any kind, is waiting to be answered by an operator. |
| 957 | ONI ACC (KL) | This is a key with a two color lamp indication. A lighted green lamp indicates that ONE ONI call is waiting to be processed. A lighted red and green lamp indicates that two (or more) ONI calls are waiting. Operation of the ONI ACC (Operator number identification-accept) key notifies the automatic equipment that the position will accept an ONI overlap call. The operator may be working a loop and find that she has time to accept an ONI call. If the call does come to her position, the loop she was working is automatically placed on HOLD. The HOLD lamp flashes. A different loop is seized by the ONI call. After the seven digit calling number is "keyed" and the POS RLS key is operated the operator is automatically re-connected to the original loop and the HOLD condition is removed |
| 906 | COIN CONTROL | (Coin Control designation of nonilluminated keys.) |
| 996-A | COL (K) | Collect. Collect key operation is a "backup" for collecting coins. Generally, it is not necessary because the coins are automatically collected when the calling party goes on-hook. |
| 996-B | RET (K) | Return. Return key operation allows the operator to return a coin deposit. In the case of coin originated station-to-station traffic where the operator may leave the connection before the called party answers, the coins are automatically returned if the calling oarty goes on-hook before the called party answers. |
| 958 | RING | (Function designation of nonilluminated keys.) |
| 958-A | BACK (K) | Ring back (to the calling party). Allows the operator to ring BACK to a PBX or distant operator or coin subscriber who has gone onhook, after the call has come back to a position. Some tributaries are not arranged for ring-back and the calling coin station must, therefore, be instructed to flash on completion of an overtime call in order to recall an operator. |
| 958-6 | FWD (K) | Ring forward (to the called party). Permits re-ring to a "121" (Inward) operator. Also permits re-ring on a collect call to a coin station after the call signal has come back to a position. If the called office is not arranged for rering, the called coin station must be instructed to flash on completion of an overtime collect call in order to recall an operator. |
| 925 | T & C (KL) | Time and charge marking key (illuminated). Operation of this key allows the operator to process a time and charge request from any non-coin station by "marking" the automatic equipment to prepare a time and charge ticket at the completion of the call. A lighted lamp indicates T & C marking has been received by the equipment, either by operation of the key or automatically in cases where all calls from certain subscribers always require time and charges. (PBX's etc.) |
| 909 | RELEASE | (Release control of forward and back connection.) |
| 909-A | BACK KL) | Release back connection (to calling party). The BACK lamp and key are used on operator-originated calls only. A lighted red BACK lamp indicates that the connection to the calling party has not been established. After the calling number is keyed and the ST key operated, the light goes dark. Operation of the key, with a dark lamp, breaks the back build-up or connection and the lamp lights red. (Operation of this key on non-operator originated calls, disconnects the calling subscriber.) |
| 909-B | FWD (KL) | Release forward connection (to called party). A lighted red FWD lamp indicates that the forward connection has not been established and that the ST key must be operated. If the lamp is dark, operation of the FWD key breaks the forward connection or prevents the forward build-up until the ST key is operated. The FWD lamp lights red. Operation of the FWD key does NOT erase the called number from the automatic equipment and the connection can be established or re-established by operating the ST key. |
| 915 | STATION [1] | (Station class and type assignment keys.) |
| 915-A | PAID (KL) | Station-to-Station, sent paid. |
| 915-B | COL (KL) | Station-to-Station, sent collect. |
| 915-C | SPL CLG (KL) | Station-to-Station, charge to other than the originating number, at the instruction of the originating subscriber (credit card, 3rd number, etc.). |
| 915-D | SPL CLD (KL) | Station-to-Station, charge to other than the terminating number, at the instruction of the terminating subscriber. (Credit card, 3rd number, etc.). |
| 915-E | AUTO COL (KL) | Station-to-Station, automatic collect (Enterprise, etc.). |
| 959 | PERSON [1] | (Person class and type assignment keys.) |
| 959-A | PAID (KL) | Person-to-person, sent paid. |
| 959-B | COL (KL) | Person-to-person, sent collect. |
| 959-C | SPL CLG (KL) | Person-to-person, charge to other than the originating number, at the instruction of the originating subscriber (credit card, 3rd number, etc.). |
| 959-D | SPL CLD (KL) | Person-to-person, charge to other than the terminating number, at the instruction of the terminating subscriber. (Credit card, 3rd number, etc.). |
| 916 | NO CHG (KL) | No charge—This key has a two color (red and green) lamp cap. It is operated to provide a "no charge" indication (type digit) to the automatic equipment. A lighted red lamp indicates the equipment has been "called for" and the subsequent lighting of the green lamp indicates the equipment's acknowledgment of the "no charge" marking. Assuming the "NO CHG" key has been operated and is followed by the operation of the "POS RLS" key (D2), a billing record will not be made. If, however, the operation of the "NO CHG" key is followed by the operation of the "TIME ST" (D2) and "POS RLS" (D2) keys, a billing record (with "no charge" type indication) *will* be made. |
| 926-A | POS RLS (KL) | Position release. The POS RLS key releases a loop from the position so that a new call may be received. If the loop has been placed on HOLD, the POS RLS key releases the position circuit from that loop. The POS RLS key is effective only if all ticketing information has been provided (called number, calling number, classtype information, timing started and, on certain calls, rate or guest number). or if a ticket is not required (no charge or transfer), If the key is operated while some information is missing, the POS RLS lamp flashes at 120 IPM while the key is depressed. |

See footnotes at end of table.

| Identification number | Item or designation | Description and/or function |
|---|---|---|
| 926-B | CA CALL (K) | Cancel call. The non-illuminated CA CALL key provides a means to force the release of a connection. Its operation releases the automatic equipment, the loop and the position. The originating subscriber receives busy tone from his line equipment. |
| 926-C | TIME ST (KL) | Time Start. This key has a two section lamp cap which lights red until the equipment has been "conditioned" to start timing the call upon answer of the called party. The TIME ST key is operated whenever the "start of conversation" is the next step in the progress of the call. The lamp turns green to indicate that the "start timing" indication has been given to the automatic equipment. If the key is operated prematurely, it has no effect—the lamp remains red. If a call is processed on a "no charge" (NO CHG) basis, it is not necessary to operate the TIME ST key unless company policy requires a tape on such calls. Re-operation of the key, after the lamp is green, cancels the timing and the lamp turns red. |
| 908 | DISPLAY | (Designation of the key grouping which allows the operator to activate the numerical display (A2; A3; A4) associated with each particular key. The keys are effective whenever the position is associated with a LOOP (D3) and the requested information is available from the equipment.) |
| 908-A | RATE (K) | This non-illuminated key causes the minute and rate digits to be displayed along with the words "minutes" and "rate" (effective only if a rate or rate code has been stored in the automatic equipment). The minute digit values are dependent on whether the call is in an initial period or in an overtime period. |
| 908-B | SPL NO (KL) | Special (billing) number. This key lights when operated and displays the credit card number or a third number (effective only if a credit card or third number has been stored in the automatic equipment). |
| 908-C | CLG NO (KL) | Calling Number. This key lights when operated and displays the seven or ten digit calling number. |
| 908-D | CLD NO (KL) | Called Number. This key lights when operated and displays a seven or ten digit called number. |
| 913 | "Loops" | Each TSD is equipped with four loops which may be compared to four (front and rear) cord pairs on a manual cord-type tollboard. Each loop is comprised of a combination of five keys and lamps: access key, hold key, called key, calling key, and time. Together, these items afford the operator a connection with the functional toll equipment. The operator receives a call via a loop and disposes of it over the same loop. The operator may be connected to only one loop at a time and no new calls will be directed to her position while she is connected to a loop. Calls are directed to the loop in a rotating "right to left" sequence thereby allowing the operator to anticipate the appearance of her next call and also equalizing the use and wear of the loop equipment. |
| | Loop Control Keys—Each | |
| 913-B | ACS (KL) | Access Key. Operation of the ACS key allows the operator to connect her headset to the loop. She may be answering a call, initiating a call, or re-entering a loop previously placed on "hold" or signaling a "recall." On a new call, the ACS lamp flashes until the ACS key is operated. The lamp then becomes steady and informs the operator that she is connected to that loop. On operator initiated calls, operation of the ACS key causes the ACS lamp to flash until an outgoing trunk is seized. The lamp then becomes steady. Improper operation of the ACS key causes the ACS lamp to flash while the key is depressed. |
| 913-F | HOLD (KL) | "Holds" the ticketing equipment connected to the loop for supervision by the operator even though the operator releases from that particular loop. The HOLD lamp lights when the key is operated. When the operator re-enters the loop, the "hold" condition is removed—the lamp goes dark. If the loop is to be placed on "hold" again, it is necessary to re-operate the HOLD key. If on ONI overlap call is accepted, the loop being worked is automatically placed on "hold." The HOLD lamp flashes at 30 IPM. The "hold" condition is automatically removed after the ONI overlap operation is completed. |
| 913-J | CLD (ALK) | Called party supervision. Lighted: Unanswered ("on-hook"). Dark: Answered (off-hook). The key can be operated to split the calling party off the connection allowing the operator to talk to the called party. Re-operation of the key removes the split condition. |
| 913-N | CLG (AKL) | Calling party supervision. Lighted: Unanswered ("on-hook"). Dark: Answered ("off-hook"). The key can be operated to split the called party off the connection allowing the operator to talk to the calling party. Reoperation of the key removes the split condition. |
| 913-R | TIME (L) | This red lamp lights to indicate that a timer has been connected to the loop. The indication BACK indicates that the call originated from a coin box (the coin control signals are passed "BACK"). The indication FWD indicates that the call is terminating to a coin box (the coin control signals are passed "FORWARD"). Coin Box Calls. Calls identified by coin "kind of call" lamp. A timer is automatically connected for an initial three minute period on station-to-station calls. On "sent paid" station calls from a coin box, the timer is automatically connected after the class-type PAID key is operated. A call timer can be connected on collect calls to a coin box by simultaneously operating the KP RATE and MARK FWD keys. Non-Coin Calls. On calls from non-coin subscribers, the timer may be connected for the notify function by operating the KP NFY key and then "keying" a single digit for a 3, 4, or 5 minute period. When both the "BACK" and "FWD" lamps are lighted red, it indicates a "non-coin" subscriber has requested initial period notification. General. If a loop is placed on hold, the timer remains lighted. When the notify or charges due signal is sent, the lamp flashes at 120 IPM until the operator connects to the loop. |
| 910 | "KP ( ) LAMPS & KEYS" | The KP ( ) lamps are used to indicate the necessary call information which has not been automatically secured and is, therefore, missing and must be provided to the equipment. Operation of a particular KP ( ) key associates the KEYSET with the automatic equipment, in such a manner, that the operator may then "key-in" that particular information. Missing information may be "keyed" in any order. A dark lamp indicates the information is stored in the equipment. The operator may "erase" previously stored information by operating the associated key and "keying" new information. |
| 910-D | KP CD (KL) | Key Pulse Called Number. A lighted KP CD lamp indicates that the called number is missing. Operation of the KP CD key associates the keyset so that the called number may be "keyed." Other KP lamps that may be lighted go dark until this operation is completed. The called number may consist of not less than three, nor more than ten, digits. After the address is "keyed," the operator must depress the ST key after which the KP CD lamp will go dark. |
| 910-C | KP CG (KL) | Key pulse calling number. A lighted KP CG lamp indicates that the calling number is missing. Operating of the KP CG key associates the keyset so that the calling number may be "keyed." Other KP lamps that may be lighted go dark until this operation is completed. After calling number is "keyed", the KP CG lamp goes dark. The calling number must consist of seven digits. |
| 910-B | KP NFY (KL) | Key pulse the "notify" period. The initial notify period on coin box calls is automatically set at minutes. If the initial period should be four or five minutes, the operator must depress the KP NFY and then "key" a 4 or a 5. The key is also used to provide a 3, 4, or 5 minute "notify" period for non-coin subscribers who request such notice. |

See footnotes at end of tables.

| Identification number | Item or designation | Description and/or function |
|---|---|---|
| 910-A | KP TBL (KL) | Key pulse (one digit [2]) trouble code. If trouble is experienced on a connection (poor transmission, cut-off, etc.) the originating subscriber can recall an operator by "flashing". The operator can now insert the trouble code by operating the KP TBL key and keying the one digit code corresponding to the trouble encountered. The call may be re-established. |
| 910-G | MARK BACK (KL) | This key is used on "WH" or "TX" calls and on operator-originated calls to "mark" the automatic equipment to establish a connection "back" to the calling subscriber after the ST key has been operated. The green MARK BACK lamp will light when the key is operated. MARK BACK can also be operated simultaneously with the KP RATE key to connect a timer on a call from a coin box or to connect a timer to a tributary coin box which arrived without coin box "kind of call" marking. |
| 910-H | MARK FWD (KL) | Operation of this key lights the green MARK FWD lamp to cancel a previous MARK BACK operation, thereby allowing the automatic equipment to establish a connection "forward" to the called party. MARK FWD can also be operated simultaneously with the KP RATE key to connect a timer on a collect call to a coin box. |
| 910-F | KP SPL (KL) | Key pulse special (billing) number. A lighted KP SPL lamp indicates that the class-type SPL CLG or SPL CLD key has been previously operated and the special billing number has not, as yet, been keyed into the equipment. Operation of the KP SPL Key associates the keyset so that the ten digit billing number may be "keyed" into the equipment after which the KP SPL lamp will go dark. A previously "keyed" billing number may be "erased" and a new billing number "keyed" by subsequent operation of the KP SPL key. |
| 910-E | KP RATE (KL) | Key pulse (three digit) rate. A lighted KP RATE lamp indicates that the three digit rate or rate code is missing on calls from a coin box. Operation of the KP RATE key associates the keyset so that the rate may be keyed. Other KP lamps that may be lighted go dark until this operation is completed. After the rate is keyed, the KP RATE lamp goes dark. |
| 927 | KP (L) | Key pulse keyset supervision. This lamp will light in conjunction with a KP ( ) key that was operated and lighted, indicating that the operator may start "keying" with her KEYSET. |
| 911 | KEYSET (K) | The ten keys, "one thru zero," of the keyset are operational whenever the KP supervisory lamp is green, and allow the operator to "key" the necessary digital information into the automatic equipment. |
| 912 | ST (K) | The "START" key must be operated to start the forward or back build-up on a "WH" or "DELAYED" type of call. The ST key is also operated after the operator "keys" a called number to indicate the "end of that number" so that equipment may be notified and start the call build-up. |
| 914 | ERROR (L) | Gives an indication to the trainee that she has pressed a wrong key. |
| 920 | START (K) | The trainee can start the program by pressing this key. |
| 921 | STOP (K) | The program can be stopped by the trainee through depression of this key. |
| 960 | MAN (K) | Key to be depressed by a new operator to gain familiarity with various keys. The depression of this key results in an effective disconnection of all the units except the register unit from the training board. |

[1] The Station and Person "class-type" keys, such as 915A, etc., each have a two-color (red and green) lamp cap. The red lamp indicates the equipment has been requested to accept the automatic class-type mark and the subsequent lighting of the green lamp is the equipment's acknowledgment to the operator that the class-type requirement has been satisfied.
[2] Any digits 1 thru 0 may be assigned, at the discretion of the operating company, to indicate a particular trouble condition.

It is apparent from the foregoing description that in actual practice, a toll service desk (TSD) operator has to be trained to monitor many types and classes of calls, as for example, coin station-to-station, hotel-dial-O person-to-person, delayed call person-to-person, etc. The extent of training will be further apparent from a detailed consideration of the fundamental steps involved in monitoring a specific one of these various types of calls and specifically a hotel, dial-O, person-to-person collect call. It will, of course, be appreciated by those skilled in the art that the sequences for other types of calls can be recorded on the tape for a similar training routine.

It is initially recalled that an exact sequence of operation for the call to be simulated is recorded on the program channel and any simulation of subscriber's voice is recorded on the audio channel.

To start the training lesson, the trainee presses a start key, such as 920, on the TSD training board 104. Pressing of key 920 results in a ground over path 104A to the comparator unit 105 (FIG. 12). Presence of ground over one of the leads of path 104A operates an advance relay, such as control relay 1, in the comparator unit 105 (as described in more detail hereinafter in the description directed to the comparator unit). Operation of the advance relay closes a loop to the tape recorder unit 101 over path 105B to cause the tape to advance one step.

The first segment of the recorded program (which is recorded in the frequency shift code) puts out a series of eighteen bit words over lead 101B to the FSK receiver 102 (FIG. 1) which decodes the words and places a digital signal to the interface unit. After the interface unit has detected a good sync in the incoming digital signal, the incoming bits are placed in an address register such as 335. With the help of a counter and decoder circuit such as the one shown as a block 306 (FIG. 3) the interface unit 103 prepares its data register 334 to start receiving the bits after the address register 335 has received the complete address (6 bits). Depending upon the address received in the address register 335, the data in the data register 334 is serially transferred to a specific register of the group 1–19 (FIG. 4). If the incoming address was 5 (for example), the data register over lead 334A and gate 335 will serially transfer all twelve bits to the twelve flip-flops in register 5 of FIG. 4. Outputs of the flip-flops of register 5 are strapped over lead 411A to the inputs of lamp drivers of lamp driver row 505. Depending upon which flip-flops had a logic 1, the corresponding lamps over lead 411B, path 103A will light the respective ones of their lamps on the TSD training board 104. For the type of call being illustrated (hotel, dial-O, person to person, collect), the first three incoming words (eighteen bits each) from the FSK receiver 102 light the following lamps on the TSD training board of FIG. 9: (i) Dial O (924–C) indicating to the operator that the subscriber has dialed O only; the operator as a result of such signal is required to key all information to automatically ticket the call; (ii) KP GST (924–D) indicating that the extension number is missing: (iii) calling area code (925–A, B, or C) indicates the area code of the calling subscriber; (iv) FWD (909–B) indicating that a forward connection has not been set up; (v) T & C (925) time and charge marking key; (vi) KP CD (910–D) indicating that the called number is missing; (vii) KP CG (910–C) indicating that the calling number is missing; (viii) TIME ST (926–C) which remains lighted red until the equipment has been conditioned to start timing the call upon answer of the called party; (ix) ACS (913–B) is caused to flash to indicate an incoming call.

Besides lighting these lamps, the program sends out digital words which enable (through address register 335, data register 334, a register, such as 401, lead 401A, relay driver row 501, lead 401B and path 103C) selected ones of the relays to operate in the comparator unit 105 which in effect identify the keys which should be depressed by the operator. If the trainee now presses the right key (ACS, 913–B in this example) the lamp lights steadily and the program will advance; otherwise an error lamp, such as 914, is lighted. The error lamp will remain lighted until she depresses the right key. Each time she presses a key, the corresponding information is passed over path 104A to the comparator unit 105 and compared against the information stored in the comparator unit 105 by the relays which were operated through the interface unit by the program. If the two sets of information do not match, an error relay operates, and the program will not be advanced. The details of the comparison circuitry will be described in more detail hereinafter.

Assuming the operator presses the ACS key (913–B), the tape moves forward, the details of the call are returned over her headset 107 from the audio channel of the tape. These details include the type of call that is to be made (collect, person-to-person, the number of the calling and the called party). The operator should now depress key PERSON-COL (959–B) which lights. She should also depress KP CD (910–D) whereby KP CG (910–C) and KP GST (924–D) lamps go dark. KP lamp (927) lights. The operator now keys in the called number via the keyset 911. The number keyed in by the operator is fed over path 104B and lead 802A for storage in the called number register 802 of register unit 106. The operator now depresses the start key 912 and the tape advances. The details of the circuit operation in effecting number storage in the various registers, such as 802, of the register unit 106 will be described hereinafter.

The recorder program now feeds a word into the system in the manner previously described to cause RELEASE FWD lamp (909–B) on the TSD desk 104 to go dark, KP CD lamp (910–D) to do dark, KP lamp 927 to go dark, KP CG lamp (910–C) to light and KP GST lamp (924–D) to light. The trainee should now depress KP CG key (910–C), whereby KP GST lamp (924–D) goes dark and KP lamp (927) lights. The trainee now keys in the seven digit calling number via the keyset 911 in the calling number register of the register unit 106. The keying of the last digit of the calling number gives an advance signal to an advance relay in the comparator unit 105, which advances the program to thereby turn off lamps KP (927) and KP CG (910–C) and to light KP GST (924–D). The trainee should now depress key (924–D), whereby KP lamp (927) lights. The trainee next keys in the four digit extension number via the keyset 911 which is stored in the "guest register" of the register unit 106. After the fourth digit of the guest number is keyed in an advance signal is given over path 106B, by the guest register to the comparator unit, whereby the program advances and KP GST lamp (924–D) and KP lamp (927) go dark. A voice message indicating that the called station has gone off-hook is now transmitted over the trainee's headset 107 by the program unit. The trainee verifies the proper party and acceptance of the collect call, and depresses TIME ST key (926–C), whereby lamp (926–C) changes to green thus completing the call sequence. The trainee now depresses POS RLS key (926–A) advancing the tape whereby the last word (a reset word) related to the illustrated call is delivered to the interface which resets the system to release the operated relays and extinguishing the lamps which were lit.

AUDIO MAGNETIC TAPE RECORDER (101)

A commercial two-channel tape recorder and player may be used in the system. One channel on the tape is prerecorded with the exact sequence of steps to be followed in a specific training program and the other channel has a simulation of subscriber voice prerecorded thereon which issues statements related to the steps in the program. The program is recorded using a key shelf simulating all the keys and lamps shown on the TSD board 104. A FSK transmitter is used to record the digital signals in a frequency shift code on the tape. The program is written in segments, each segment being comprised of various eighteen bit words. At the end of each segment, there is a word which indicates the end of such segment.

FSK RECEIVER (102)

Input to the FSK receiver from the tatpe recorder 101 is in the frequency shift code. FIG. 13 shows the correspondence of the logic levels output from the receiver responsive to the input of the different frequencies shown in FIG 13A. As will be apparent, the output of the FSK receiver is in terms of logic bits (logic 1 and logic 0) divided into address and data segments. As indicated heretofore, logic 1 is provided in response to a 2000 Hz. input signal and logic 0 is provided in response to a 1400 Hz. input signal.

INTERFACE UNIT (103)

Figure 3:
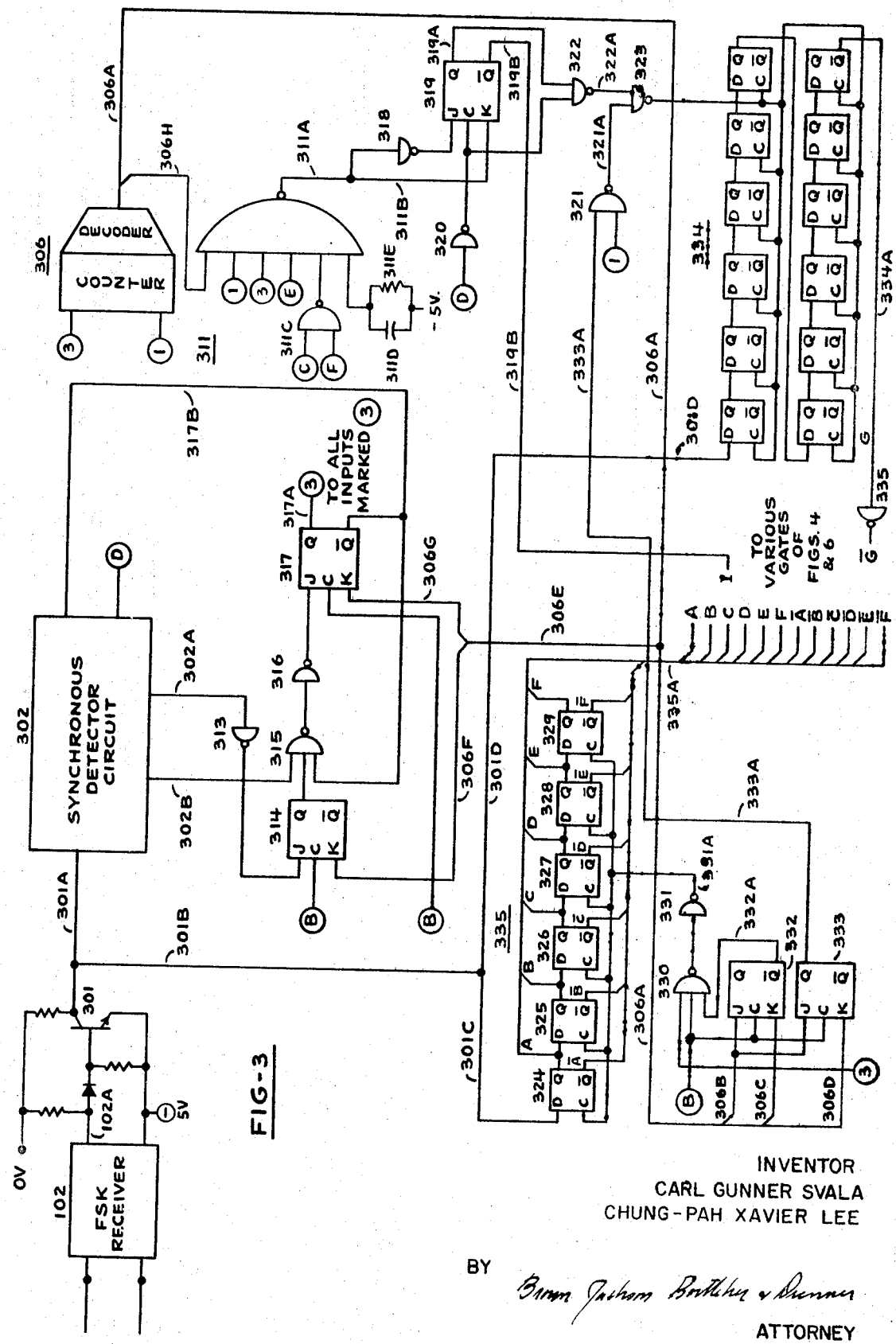
Figure 4:
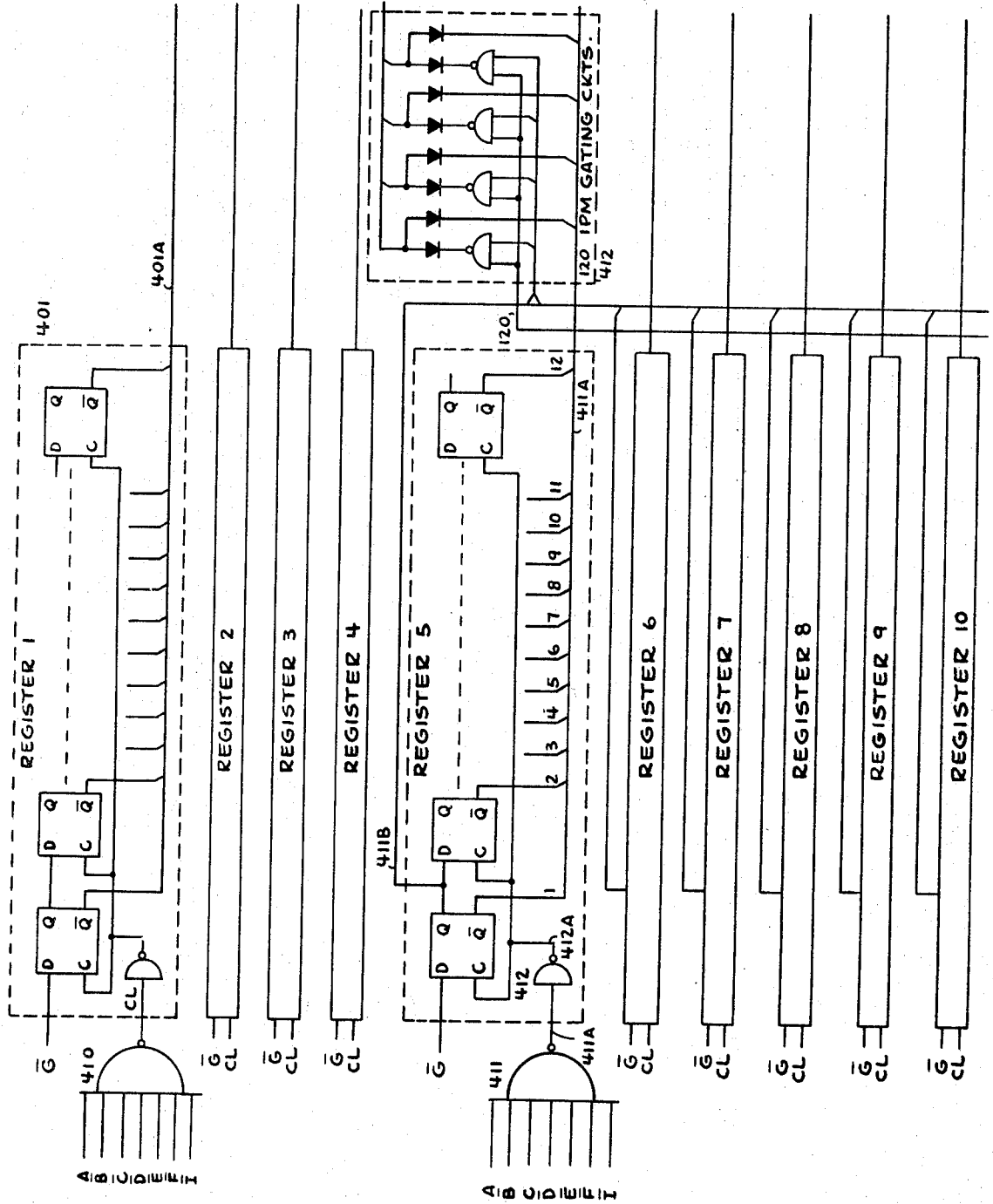
Figure 5:
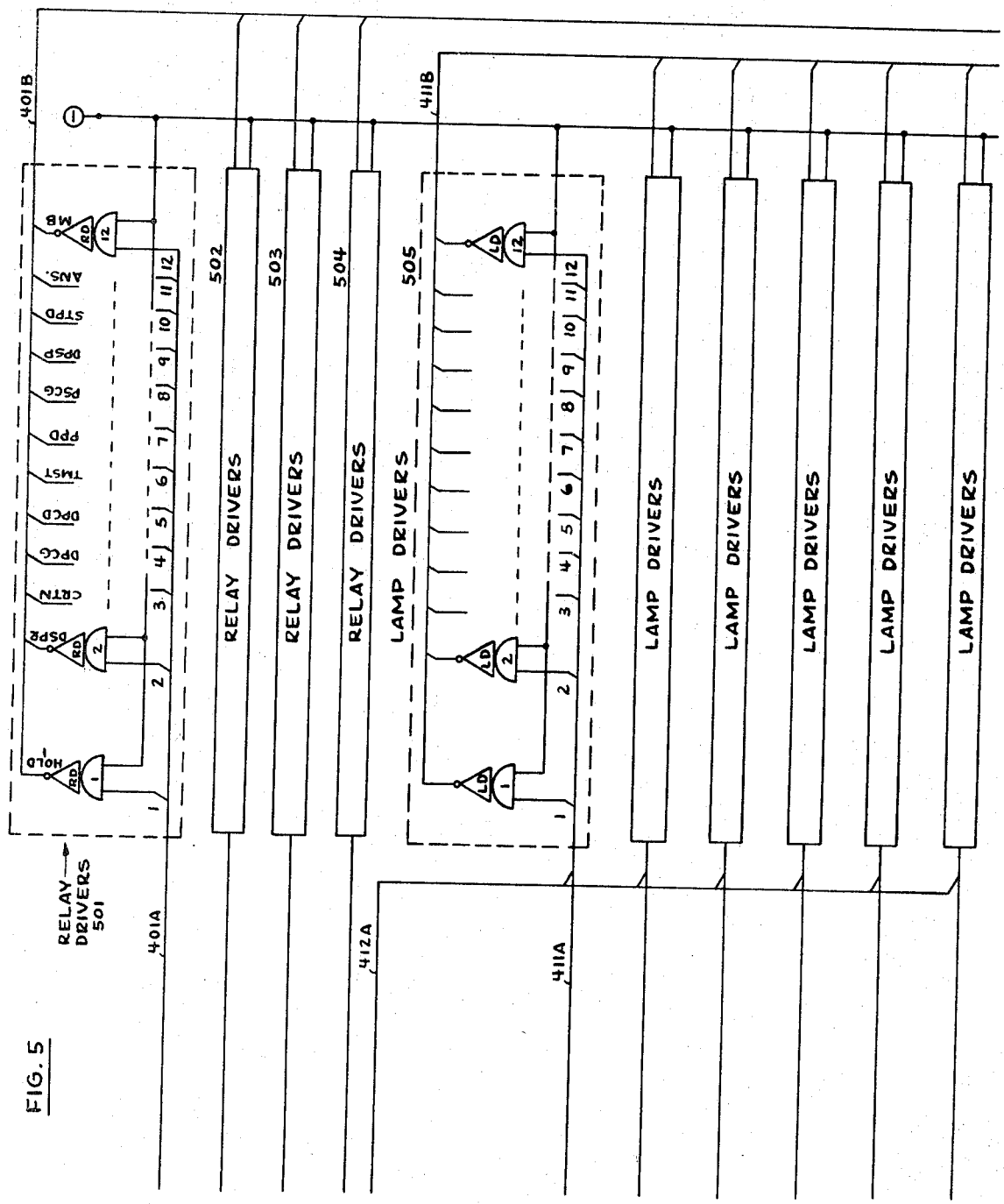

With reference to FIG. 3, the signal output from the two channels in the tape receiver is fed over path 101B to FSK receiver 102 which converts the segment frequencies to logic 1, logic 0 signals for input over lead 102A to transistor 301 in the interface unit 103. Transistor 301 is a level converter which changes the voltage level of the incoming signals from −12 to −5 volts prior to being fed a sync detector circuit 302.

Sync detector circuit 302 comprises a conventional leading edge trigger and a trailing edge trigger, the gates of which work at a clock frequency of 48.4 kHz. The sync detector circuit 302 operates in known manner to detect the leading and trailing edges for the purpose of determining the presence of a sync pulse which is high for 1½ bit times and low for 1½ bit times. Upon the detection of a good sync, the sync detector circuit 302 places ground on lead 302A which through inverter 313 sets flip-flop 314, and over lead 302B enables gate 315 for the reception of a good sync signal. With the setting of flip flop 314 over lead 302A and gate 313 in response to a good sync, a signal over gate 315 and through inverter 316 sets flip flop 317. With the setting of flip flop 317 a signal over lead 317B disables the sync detector circuit 302 and a signal over lead 317A enables a counter 306 and sets the control element 311. The output on lead 317A rests gate 30, thereby setting the output of inverter 331 which over lead 331A applies a clock pulse to the flip flops of address register 335. Application of a clock pulse enables the address register 335 to register the incoming address bits (the first six bits of the eighteen bit word) over lead 301B and lead 301C. The many address bits fed to flip flop 324 are serially shifted to the successive flip flops of the register 335.

The outputs A–F;A–F of the six flip flops 324–329 of the register are strapped in different combinations to the registers of FIG. 4. By way of example, register 4 (FIG. 4) is shown to have the following combination of inputs F E D C B A. Other registers of the group will have correspondingly different inputs (addresses) whereby the incoming addresses from the program will result in the selection of a specific one of the registers.

Counter 306 which was enabled in response to the reception of a "good sync" indicator signal over lead 317A from flip flop 317 counts in response to the 600 Hz. signal and after it has reached count 5, applies a logic 1 to the J inputs of flip flops 332 and 333 through an associated decoder 307, path 306A and lead 306B. The logic 1 signal output from the counter 306 over said path sets flip flop 332 and flip flop 333. Output of flip flop 332 on lead 332A goes to logic 0 thereby setting NAND gate 330 and resetting the output of inverter 331. A logic 0 on lead 331A removes the clock pulse from the flip flops 324–329 of address register 335 thus ensuring that no more than six bits of a word will be registered by the address register 335.

Setting of flip flop 333, over lead 333A enables gate 321 which in response to the 600 Hz. signal in turn clocks gate 323 over lead 321A. The output of gate 323 applies a clock to the various flip flops of data register 334 thereby enabling the flip flops to receive the data bits output from the FSK receiver 102 over lead 301B and 301D. The data bits are serially transferred through the twelve flip flops of register 334 and serially appear on output lead 334A for application through gate 335 to the input for the registers of FIGS. 4 and 6.

After counter 306 has counted to seventeen, it applies a logic 1 for approximately 1.67 milliseconds to enable a control element 311 via its decoder and lead 306H. The 2400 Hz. clock is combined with the 4800 Hz. clock to provide a 2400 Hz. signal which is logic 1 for ¾ of its period. This signal is further gated by the 1200 Hz. clock to provide a logic 0 output on lead 311A (i.e. for the duration of twelve 38.4 kHz. clock pulses) during the first quarter period of the synchronizing 600 Hz. clock input. The control element 311 thereby applies a logic 0 to the input of gate 318 over lead 311A and a logic 0 to the K input of flip flop 319 over leads 311A and 311B. The logic 1 at the output of inverter 318, along with a logic 0 on lead 311B, sets flip flop 309 which thereby enables gate 322 over lead 319A which then responds to the 38.4 kHz. signal. Also a logic 1 on lead 319B is strapped to the various address gates of FIGS. 4 and 6 thereby insuring that the output of gates such as 411 changes only when all the data bits have been received by the data register 34.

After a count of seventeen by the counter 306, it also applies a logic 1 to the K inputs of flip flops 332 and 333 through a decoder, lead 306A, lead 306C and 306D thereby resetting them. Resetting of flip flop 333 produces a logic 0 on lead 333A thereby disabling gate 321 removing the 600 Hz. clock from the flip flops of data register 334 preventing storage of any further data bits. A logic 1 on lead 321A enables gate 323. Gate 323 then responds to the 38.4 kHz. output of gate 322, allowing the data stored in the data register 334 to be output serially on lead $\overline{G}$ via lead 334A and inverter 335 to one of the registers 1 to 19 in FIGS. 4 and 6 as determined by the address stored in address register 335. Also, the logic 1 on lead 306A (after a count of 19 by the counter) resets flip flops 314 and 317 over leads 306E, leads 306F, and 306G thereby preparing them and the sync detector circuit to receive the next incoming sync signal.

Figure 6:
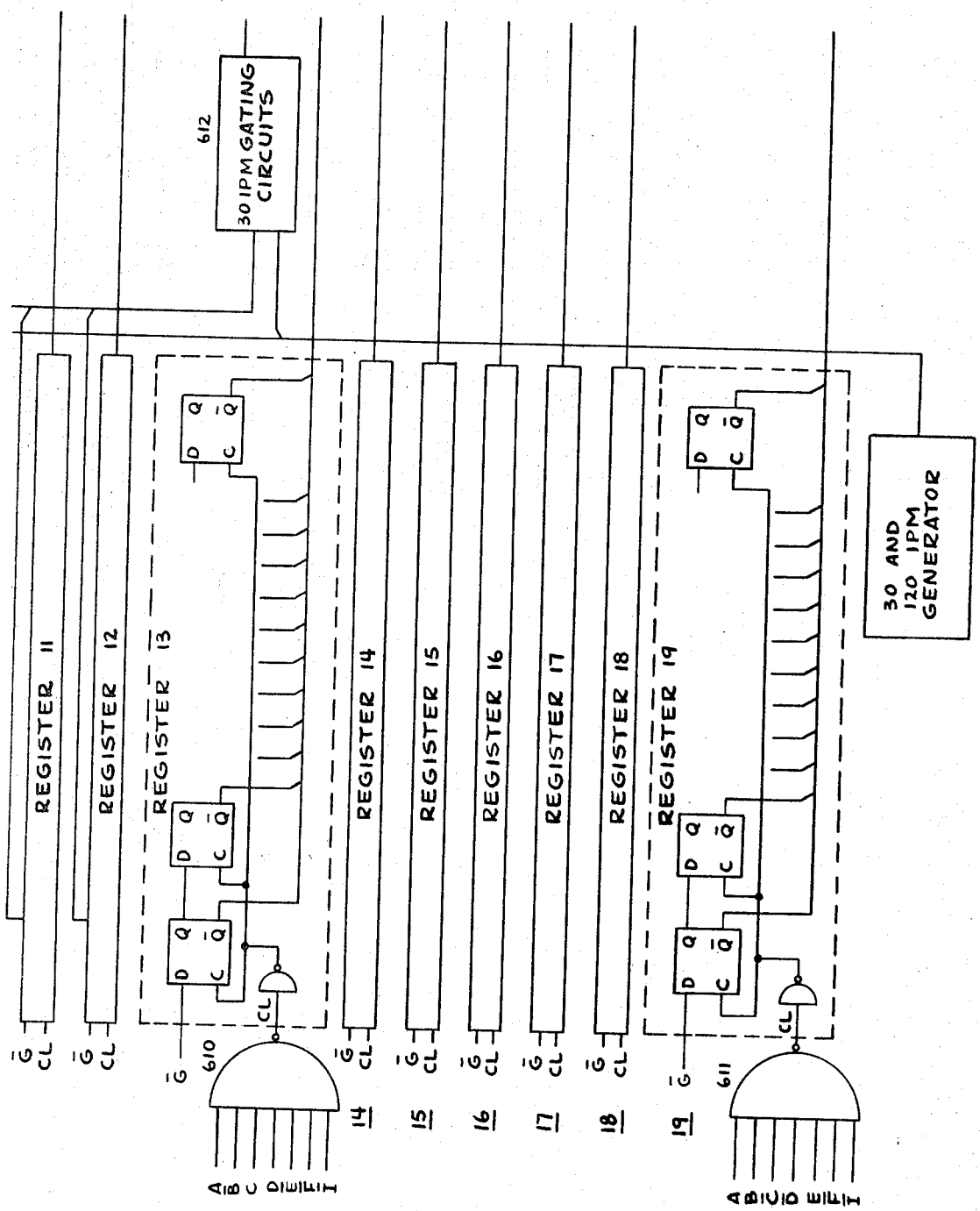
Figure 7:
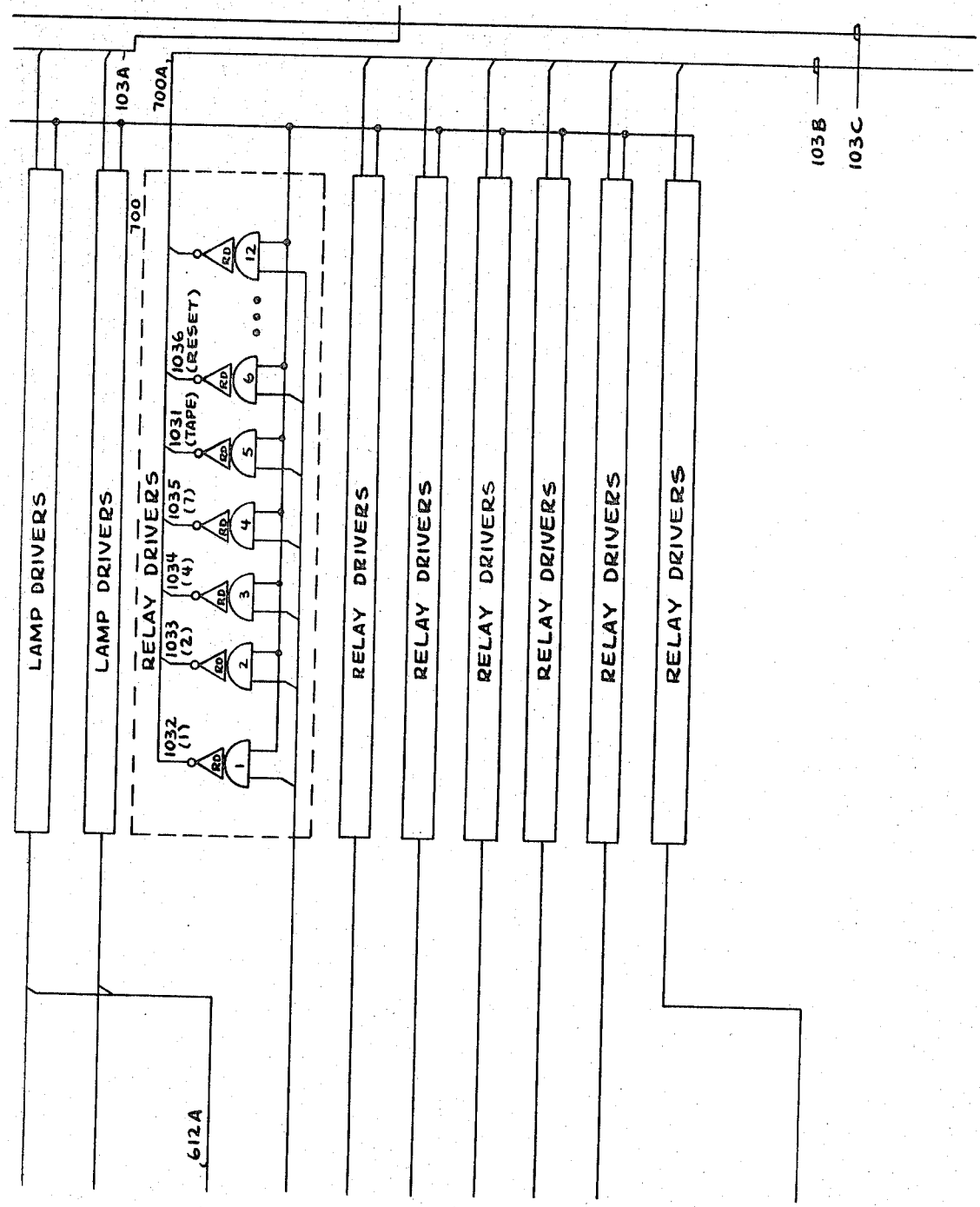

As mentioned earlier, the output of the flip flops of address register 335 are strapped in different combinations to the various address gates of registers 1 through 19 of FIGS. 4 and 6. If the incoming address is five (for example), all the address leads of gate 411 have logic 1 (A $\overline{B}$ C $\overline{D}$ E $\overline{F}$ I). When lead I (lead 319B in FIG. 3) also goes to logic 1, the output of gate 411 goes to logic 0 thereby setting the output of inverter 412 which applies a clock to the flip flops of Register 5, thus enabling them to receive the serial data bits over lead marked as $\overline{G}$ from the data register (FIG. 3). The incoming data bits are thus serially stored in the twelve flip flops of Register 5.

The outputs of the flip flops are strapped to twelve lamp drivers such as L1 of lamp driver group 505 in combinations which correspond to the data bit information received. Each of these lamp drivers correspond to a particular lamp on the TSD board 104. If a lamp is to be lighted on the TSD board, the corresponding lamp driver receives a logic 1 over an associated lead such as 411A. Also, if a particular lamp is to be flashed at a certain rate, the output is then taken over a lead, such as 411B, and fed to a 120 IPM (interruptions per minute) gating circuit and then fed over lead 412B to the lamp drivers. If a lamp is to be flashed at 30 IPM, then another gating circuit 612, similar to 412, is connected to the register over path 411A in a like manner.

Figure 8:
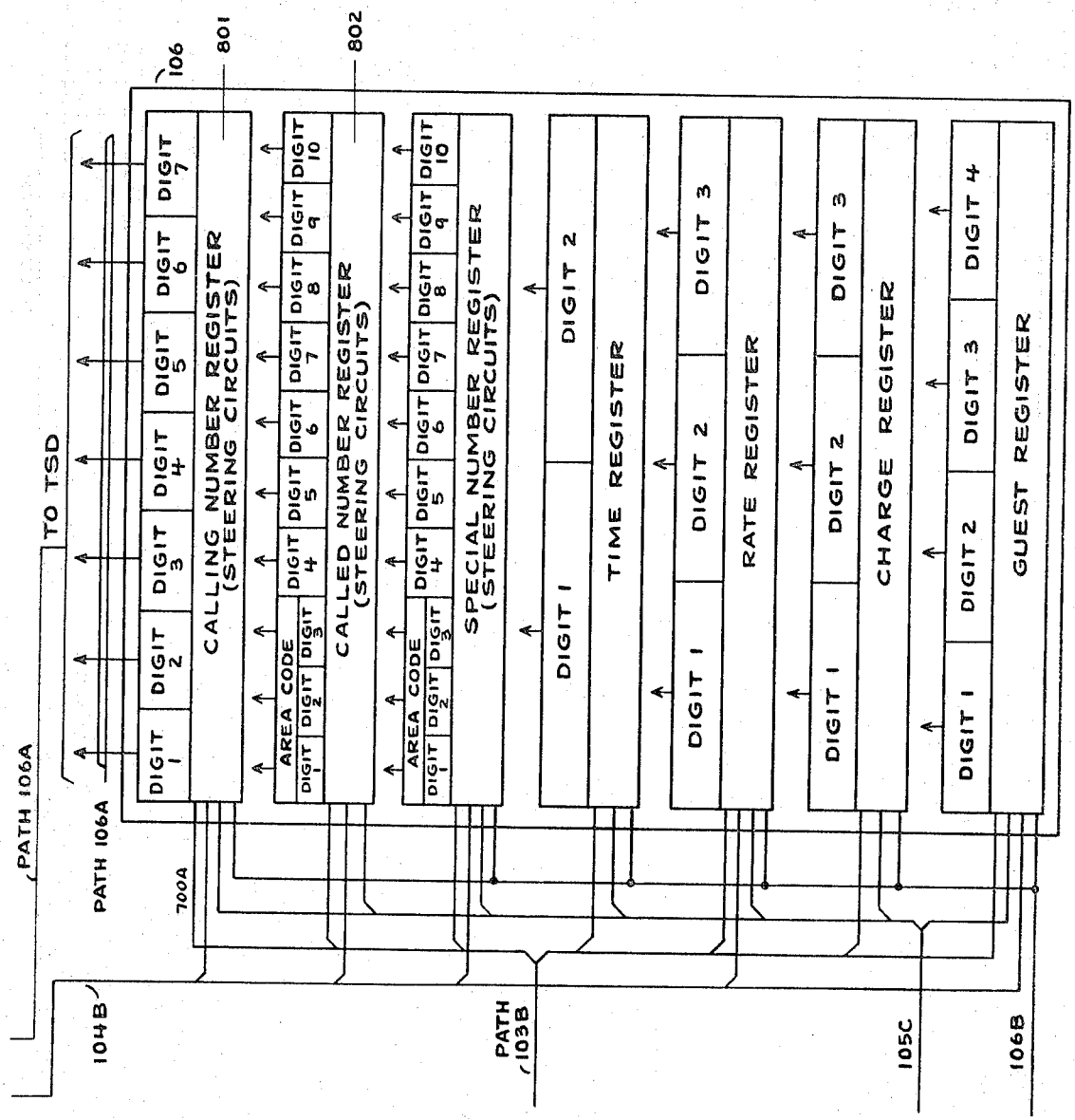

Registers 1 through 4 (similar to Register 5) are used to provide signals over leads, such as 401B and path 103C in the comparator unit 105 to drive associated relays therein. Registers 14 through 19 also provide signals to selected ones of the relay drivers of the group 700 (depending upon the bits in the incoming data bits) whose output over a corresponding lead such as 700A is fed over path 103B to an associated register such as a calling number register 801 in register unit 106 (FIG. 8). Registers 14 through 19 are used only for storing the calling or the called number, or the charge, time or rate in the register unit 106. It can be seen that a relay or a lamp which is operated by a relay drive or a lamp driver can be released or turned off by a subsequent incoming word which has a logic 0 in place of logic 1 for the corresponding bits. The relay drivers, such as 501, corresponding to registers 1 through register 4 (FIG. 4) operate the relays in the comparator unit 105 to store information in the comparator unit for comparison against the information supplied over path 104A to the comparator unit 105 as a result of the key depression by the operator in a manner to be now described.

COMPARATOR UNIT (FIGS. 14, 15, 16, 17)

As mentioned earlier, the data bits of the incoming words from the tape via the data register 334 and register 1–4 enable selected ones of the relay drivers of the relay driver row, such as 501. The outputs of all the relay drivers of relay driver rows 501, 502, 503, and 504 are strapped over path 103C to respective ones of the relays 1–42 in the comparator unit 105. Through its data bits, the program thus operates selected ones of the relays 1–42 in the comparator unit 105. If the trainee depresses a key or keys which correspond to the selected ones of the relay or relays 1–42, the program proceeds further. Otherwise, an error signal is sent to the TSD board, thereby lighting an error lamp.

Figure 15:
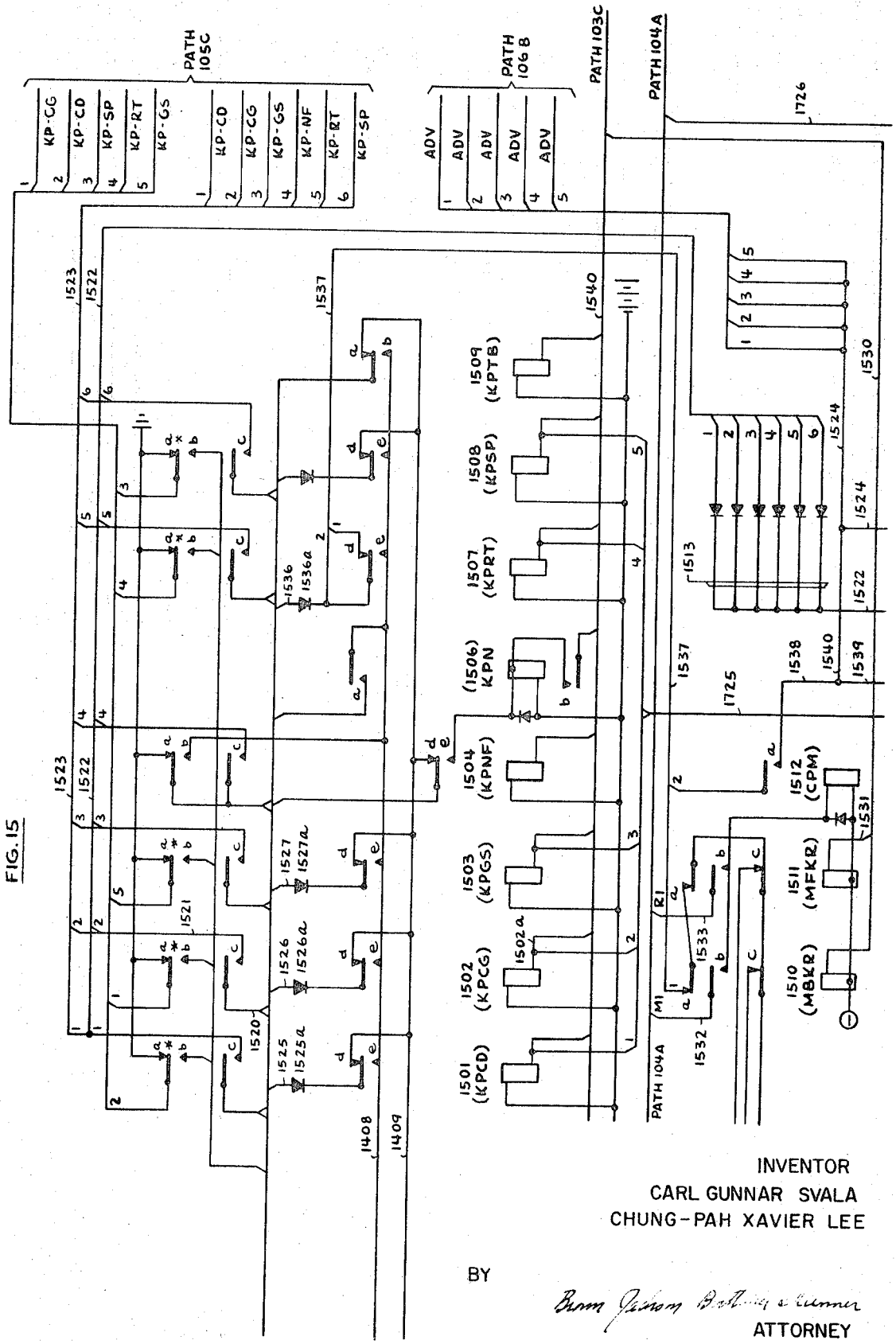

More specifically, it is assumed for purpose of illustration that at a certain stage the program require the operator to press KP CG (910–C) key. The program sends out a word with a logic 1 in the bit (as described earlier) corresponding to one of the relay drivers such as 501 (FIG. 5) which drives relay KP CG (1502—FIG. 15). The relay driver for relay KP CG operates in response to the signal to place a ground over path 103C (FIGS. 5 and 7) and lead 1502A operating KP CG relay 1502.

The program is now delayed for the operator's reaction. If the operator presses the KP CG (910–C) key (FIG. 9), a ground appears on the corresponding lead in path 104A (FIGS. 15, 14, 15) which over lead 1520 and make contact C of KP CG relay 1502 and lead 1521 is further applied to leads 1523 and 1522. The ground on lead 2 of path 1523 is fed overconductor KP CG in path 105C (FIG. 8) to the register unit 106 (FIG. 8) to set the calling number register 801 to receive the digits which are now keyed in by the operator. Presence of ground on lead 2 of path 1522 through the associated diode of a group of diodes 1513, operates KP relay 1704. Operation of 11 relay 1704 and the closing of make contact b places a ground on lead 1711 thereby resulting in a ground on lead 1714 of path 105A which lights the KP lamp 927 on the training board. Lighting of the KP lamp 927 indicates to the trainee that the calling number may now be keyed by means of the keyset 911.

After the last digit of the calling number is keyed into the register 106, ground is placed on one of the leads of path 106B (FIG. 8) (in the manner set forth in the description of calling number register) and such ground over lead 1524 (FIG. 15) is supplied to the advance relay 1705.

Figure 2:
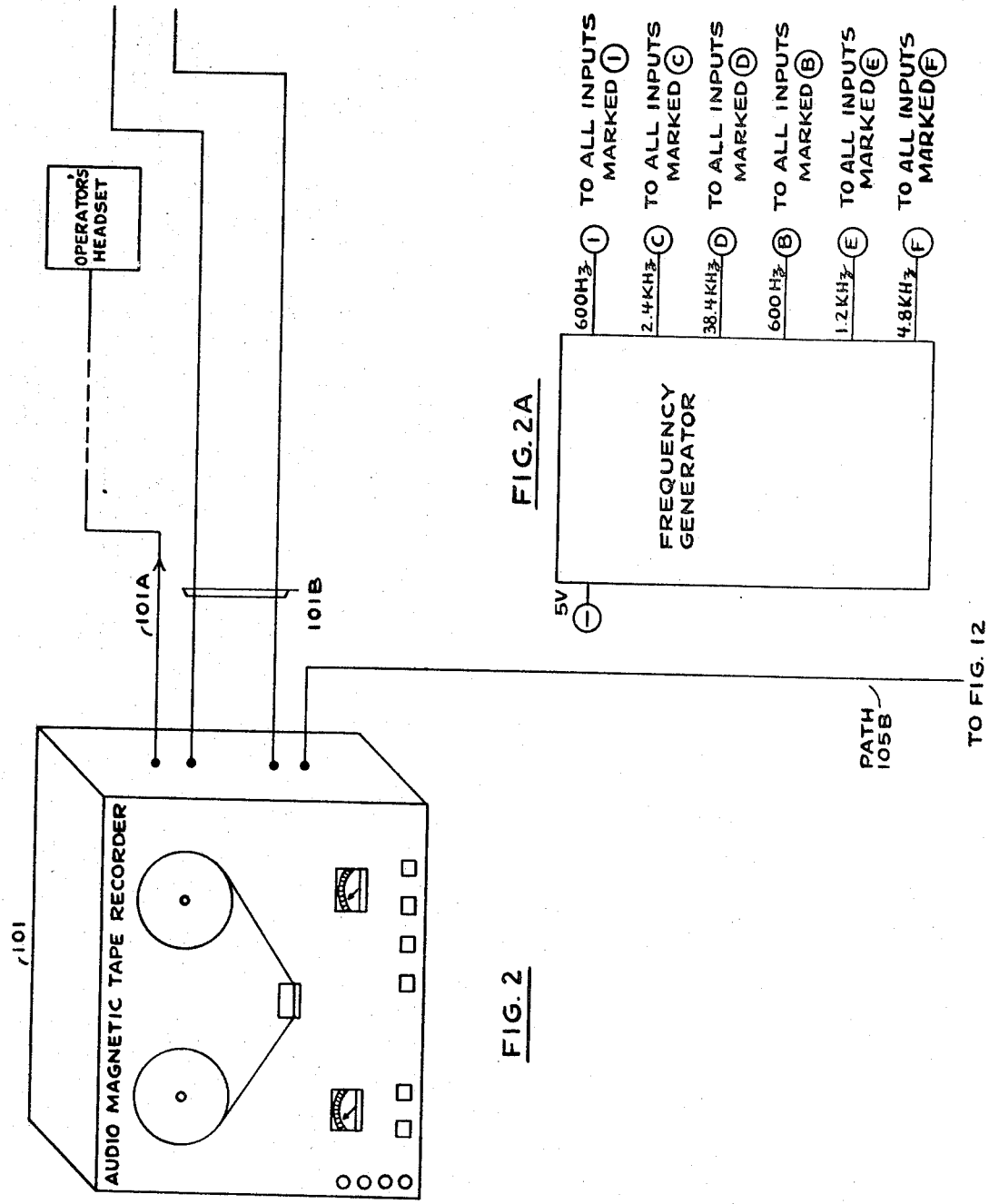
FIGS. 2 and 3, when put together as shown in FIG. 18A, illustrate the manner in which the program words are detected and their address and data bits separated.

Advance relay 1705 operates at contact b and connects ground to lead 1715 in path 1716 to operate AC relay 1701. AC relay 1701 operates and its contact a closes a loop for leads 1717 and 1718 in path 105B to signal the tape recorder 101 (FIG. 2) to advance the tape.

Advance relay 1705 at its contact C also applies ground over lead 1720 to a trial counter 1708 thereby enabling the counter to count the number of operations of relay 1705 to provide an indication of the number of correct attempts made by the trainee.

If the trainee failed to press the KP CG key (the proper key in this case) and instead pressed a different key, as for example, KP CD (910–D) key, the ground is applied to a corresponding lead over path 104A which emerges on lead 1525 (FIG. 15) and via diode 1525A, break contact d of relay 1501 and lead 1409 is applied to the lower winding of error relay 1401 which operates.

Error relay 1401 locks itself over its make contact d and resistor 1402, and its make contact a connects ground over lead 1410, path 1710, error lead 1713, and path 105A to light error lamp 914 on the training board (FIG. 9). In addition, error relay 1401 at its make contact b places ground over lead 1411 to enable the error counter 1406 which counts the number of errors made by the trainee. Since the relay 1401 has locked itself, and no signal has been given to the advance relay 1705, the error lamp 914 remains lit and the program is not advanced until the trainee depresses the proper key.

If the trainee now depresses the proper key (KP CG in the present example) ground over path 104A and the associated lead which emerges as lead 1526 (FIG. 15) is fed through diode 1526a, make contact e of relay 1502, lead 1408, the make contact c of error relay 1401 and the upper winding of relay 1401, which releases to open contacts a and thereby extinguish the error lamp on the training board. As explained earlier, the ground on lead 1520 over make contact c of relay 1502, lead 1521, and paths 1522, 1513 operate the KP relay 1704 to light a KP lamp 927 on the training board. After the trainee has keyed in the calling number, an advance signal is given to the advance relay 1705 which operates, and through relay 1701 in the manner described causes the tape and hence the program to move further.

Figure 14:
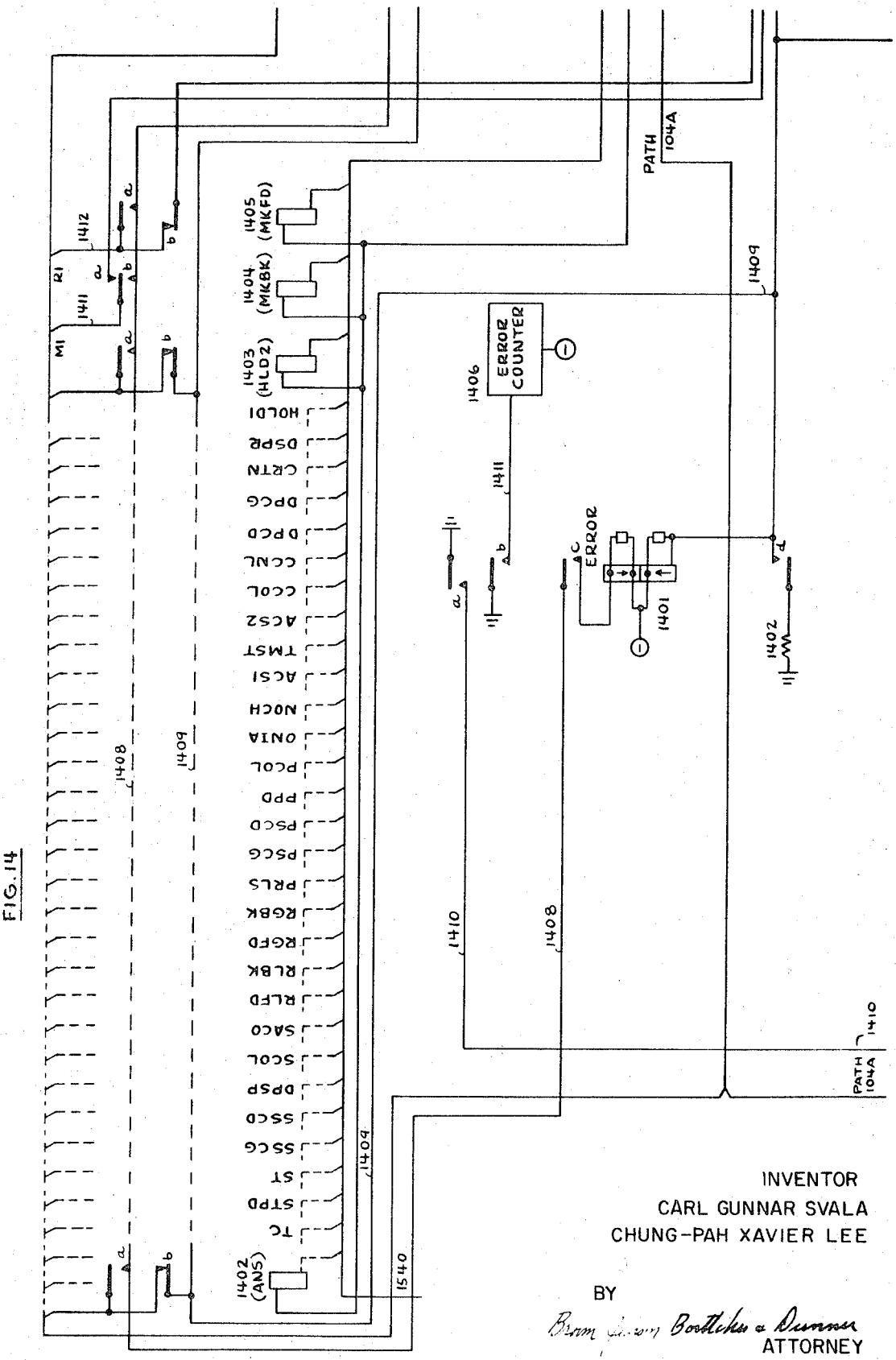
FIGS. 14, 15, 16 and 17, when put together as shown in FIG. 18D, disclose the details of the comparator unit.

In certain call sequences, as for instance, a collect call to a coin station, the operator is supposed to press both KP RATE and MARK FORWARD or MARK BACKWARD keys simultaneously. A set of three relays 1510, 1511, 1512 are provided for use in the checking operation. If such a call is being simulated, the program through the interface unit and the selected one of the relay drivers places ground on the lead in path 103C (FIGS. 5, 7) which emerges as path 1530 (FIG. 15) and lead 1531 to operate relay 1511. If the trainee presses keys KP RATE (910–E) and MARK FWD (910–H), then the ground over path 104A appears on leads 1532, 1533, 1536 (FIG. 15) and 1411, 1412 (FIG. 14).

Ground on lead 1533 through make contact b of relay 1511 operates relay 1512. Ground on lead 1536 through diode 1536a over lead 1537 and make contact a of relay 1512, and leads 1538, 1540, and 1524 energizes advance relay 1705. Relay 1705 operates and at its contact b operates relay 1701 to provide an advance signal to the tape in the manner described. If, however, only one of the (KP RATE or MARK FWD) keys had been depressed, then contact a of relay 1512 would be open and no advance signal would be provided on a lead 1524 to advance relay 1705. If only the MARK FWD key is pressed, there would be no ground on lead 1537, and again the advance signal would not be provided for relay 1705.

LOCKING KEYS

Figure 16:
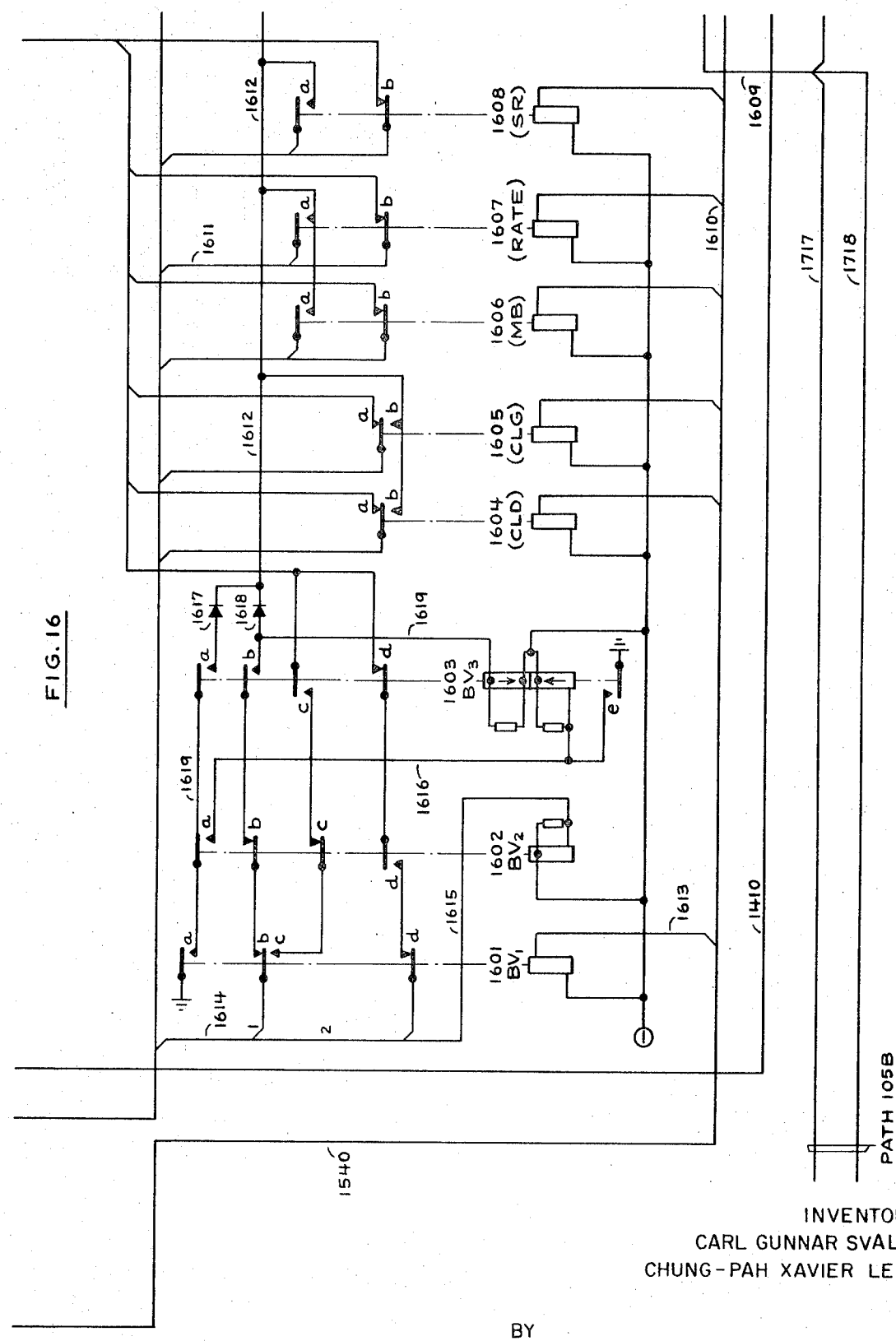
Figure 17:
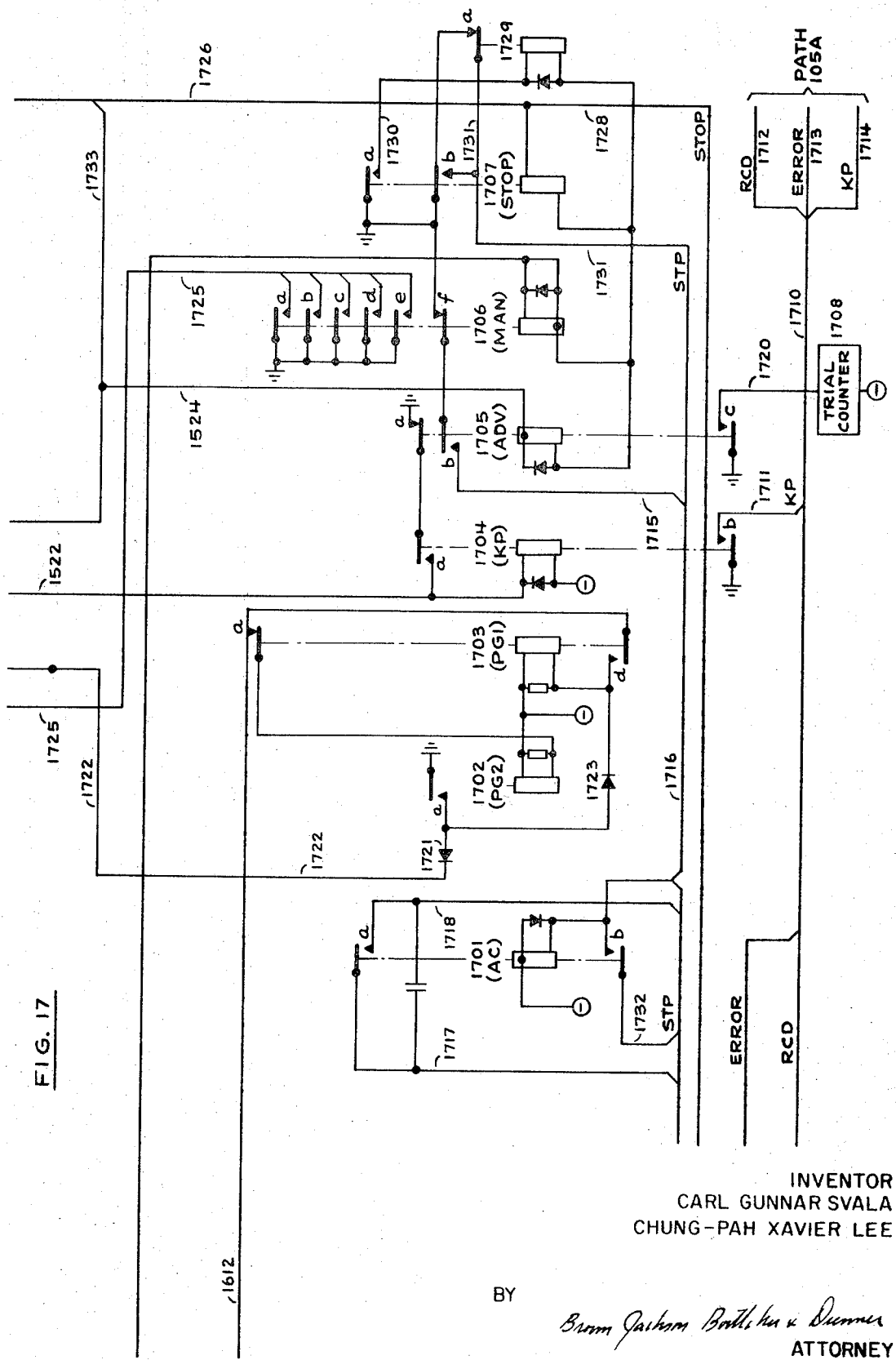

Relays 1601, 1604, 1605, 1606, 1607, and 1608 correspond to the locking keys such as 950–A on the training board. Assuming the program signal requires that the RATE key (950-A) is supposed to be depressed by the trainee, the program through the relay driver in the interface unit provides a signal over paths 103C, 1540, and 1610 to operate the rate relay 1607. If the trainee now depresses the locking RATE key (950–A), a continuous ground appears on lead 1611 (FIG. 16) of path 104A which over the make contact a of the operated relay 1607 appears on lead 1612 and through the break contact a of relay 1703 energizes relay 1702.

Relay 1702 operates and at its contacts a applies ground over diode 1723 to relay 1703, which operates and at its contact a releases relay 1702. Relay 1703 locks itself to the ground on lead 1612 through its make contact d. As relay 1702 operates and releases a ground pulse is applied over contact a, diode 1721, lead 1722, lead 1540, and lead 1524 to advance relay 1705 which causes the program to advance in the manner earlier described.

Busy verification key (950–B) is also a locking key but the trainee must release such key immediately after the busy verification test is over so as to release the trunk which is used for the test. When the trainee is to depress BV key (950–B) the program (through a selected one of the relay drivers in the interface unit) applies ground over path 103C, path 1540, and lead 1613 to operate BV relay 1601. If the trainee now depresses BV key (950–B), a ground is fed over the conductor over path 104A wind path 1614 which emerges as lead 2 and which is connected to BV2 relay 1602. Relay 1601 at its make contact a completes a circuit over make contact a of relay 1602, and lead 1616 to operate relay 1603, which locks itself to the energizing circuit over its make contact e. Ground through make contact a of relay 1601, lead 1619, make contact a of relay 1603, and diode 1617 appears on lead 1612 and one of the relays 1702 or 1703 (depending on the position of these relays). The relay (1702 or 1703) thus energized operates to apply a ground pulse to the advance relay 1705 to cause the program to advance. The program now disables the operated relay driver in the interface unit which releases relay 1601.

If trainee now releases the BV key (950–B) the program will advance; that is, as the BV key is released, a ground appears on lead 1 of path 1614 which through break contact b of relay 1601, break contact b of relay 1602, make contact b of relay 1603, and diode 1618 puts a ground on path 1612 to enable 1702 or 1703 to advance the program as described. The ground applied through make contact b of relay 1603 and over lead 1619 to relay 1603 effects disablement of relay 1603.

DESK PRACTICE MODE

A manual key (960) is provided on the training board for the purpose of permitting the operator to disable portions of the desk while practicing keying of numbers into the system. As manual key (960) is depressed, ground is connected over an appropriate lead over path 104A to manual relay 1706 which operates and at its contact a–e enables relay 1501, 1502, 1503, 1507 and 1508. At this time, the operator may keep any number of digits without turning on the error lamp.

When the trainee has completed the required responses to the training program, a ground pulse is sent by a selected one of the relay drivers, such as 501, over path 103C, path 1540 (FIGS. 14, 15, 16), and lead 1728 which operates stop relay 1707. The trainee can also stop the program by depressing the STOP (921) on the training board which puts a ground pulse over path 104A and lead 1726 to relay 1707. STOP relay 1707 operates and at its make contact a and lead 1730 provides ground to operate relay 1729. As relay 1729 operates, it is effective at its break contact a to remove the holding ground for relay 1701, which releases to open its loop and stop the tape recorder.

The trainee can restart the program from the training board by pressing a stop button, such as 920, which puts a ground over path 104A, leads 1726, 1733, and 1524 to operate the advance relay 1705 which enables relay 1701 to start the program.

REGISTER UNIT (FIGS. 8, 10, 11)

As mentioned earlier, register unit 106 comprises six registers including (i) a calling number register (ii) a called number register (iii) a special number register (iv) a time register (v) a rate register, and (vi) a guest register. Except for the number of digits each register is capable of storing, the registers are essentially alike. Relevant digits can be fed to register unit 106 for storage either over path 104B in response to key operation by the trainee, or over path 103 as provided by the program on the tape through the interface unit 103. The calling number register 801 in register unit 106 is explained in detail hereat; the functioning of the other registers will be apparent therefrom.

STORING DIGITS RECEIVED FROM TAPE

With reference to FIGS. 10, 11, it will be observed that relay 1006 is normally operated by a circuit which extends from battery over the winding of relay 1006 contacts 1050a and ground received over lead 1029 of path 105C from the comparator 105. The storing of a set of digits input from the tape is now set forth.

1st digit

In preparation for storing digits received from the tape recorder 101 via the FSK receiver 102 and interface unit 103 via path 103b, a ground pulse is first placed on lead 1036 (FIG. 10), momentarily operating 1050 which at its contacts 1050–a release relay 1006 which in turn opens its contacts, releasing any digit bin relays or counting chain relays (to be described) which may be locked thereto. At the end of the pulse, relay 1050 releases and relay 1006 reoperates. The program also places a ground pulse on tape lead 1031 of path 103B to operate the tape relay 1013 which locks over contacts 1013–b and contacts 1005–h of the first counting relay 1005 to ground.

The first incoming digit is received as a ground pulse on one or two of the code leads 1032–1035 of path 103B in a 1, 2, 4, 7 code as indicated. The ground pulse (or pulses) through pertinent ones of rectifiers 1013R–1016R, lead 1038, contacts 1004–e, the lower winding of relay 1003, contacts 1101–h, 1102–h, 1103–h, 1104–h, 1105–h, 1106–h, 1013–a, and the winding of relay 1005 to negatove potential, operates odd relay 1003 and the first counting relay 1005 in series. Relay 1003 locks over its upper winding and contacts 1003–f to ground on lead 1038. Relay 1005 locks over contacts 1005–f 1101–g, 1102–g, 1103–g, 1104–g, 1105–g, 1106–g, lead 1054 contacts 1051–a, and contacts 1006–c of normally operated relay 1006 to ground. Contacts 1005–f make before contacts 1005–g break.

While relays 1003 and 1005 are both operated, ground on one or two of the code marking leads 1032–1035, through pertinent ones of the rectifiers 1039–1042, pertinent contacts 1003–a to 1003–d and 1005–a to 1005–d and cable 1156 operates pertinent ones of relays 1007 to 1010 of the digit 1 storage bin 1011. The operated ones of the relays lock over their make contacts and contacts 1006–a to ground. A contact fan comprising contacts of relays 1007–1010 prepares to ground one of the decimal leads 1–0 of path 106A leading to Nixie tube 933 (FIG. 9) on the TSD board 104 preparatory to energizing the corresponding filament of Nixie tube 933 on the display panel 900 (FIG. 9).

Relay 1005 at its break contacts 1005–h releases relay 1013 which, at its contacts 1013–a opens the original operating circuit of relays 1003 and 1005.

When the ground pulse disappears from leads 1032–1035, ground disappears from lead 1038 deenergizing the upper holding winding of relay 1003 which restores.

2nd digit

When the ground pulse for the second digit appears on code leads 1032–1035, the second counting relay 1101 operates in series with the even relay 1004 over a path which extends from ground on lead 1038, over contacts 1003–e, the lower winding of relay 1004, contacts 1005–e, and the winding of relay 1101 to battery. Relay 1004 locks over a circuit which extends over its upper winding and contacts 1004–f to ground on lead 1038. Relay 1101 locks to ground over its contacts 1101–f; and at its contacts 1101–g releases relay 1005. Relay 1101 at its contacts 1101–h, further opens the original operating start circuit of relays 1003 and 1005.

While relays 1004 and 1101 are both operated, the ground on leads 1032–1035 through contacts of relays 1004 and 1101 and cable 1156 selectively operate relays of the digit-2 storage bin 1012, which through its contact fan prepares to selectively ground one of the leads 1–0 leading to Nixie tube 934.

When the ground pulse disappears from leads 1032–1035, ground disappears from lead 1038, deenergizing the upper holding winding of relay 1004 which releases.

3rd digit

When the ground pulse for the third digit appears on leads 1032–1035, the third counting relay 1102 operates in series with the odd relay 1003 over the path which extends from ground on lead 1038, over contacts 1004–e, the lower winding of 1003, contacts 1101–e, and the winding of relay 1102 to battery. Relay 1003 locks to ground on lead 1038; and relay 1102 at its contacts 1102–g releases relay 1101 and at its contacts 1102–f locks to ground.

While relays 1003 and 1102 are both operated, digit bin 3 is set in the manner previously described. When the ground pulse disappears from leads 1032–1035, relay 1003 restores.

4th digit

On the fourth digit, relays 1103 and 1004 operate in series over the path which extends from ground on lead 1038, over contacts 1003–e, the lower winding of relay 1004, contacts 1102–e, and the winding of relay 1103 to battery. Relay 1004 locks to ground on lead 1038; and relay 1103 locks to ground through its contact 1103–f; and at contacts 1103–g releases relay 1102.

When relays 1004 and 1003 are both operated, digit bin 4 (indicated but not shown) is set.

When the ground pulse disappears from leads 1032–1035, relay 1004 releases.

5th digit

On the fifth digit, relays 1104 and 1003 operate in series and locks; relay 1103 is released, digit bin 5 (indicated but not shown) is set and relay 1003 releases.

6th digit

On the sixth digit, relays 1105 and 1004 operate in series and locks; relay 1104 is released, and digit bin 6 is set (indicated but not shown). When the ground pulse disappears, relay 1004 releases as a result thereof. Relay 1105 operates relay 1107 over contacts 1105–i.

7th digit

On the seventh digit, relays 1106 and 1003 operate in series. Relay 1003 locks to ground on lead 1038 through its contacts 1003–f. Relay 1106 locks over contacts 1106–e and 1107–a to ground on lead 1038. Relay 1106 at its contacts 1106–g, releases relay 1105 which releases relay 1107. With relays 1106 and 1103 operated, digit bin 7 is set.

When the ground pulse disappears from leads 1032–1035, relays 1106 and 1003 are both released as a result thereof.

It should be noted that although digit bin relays have been set, no ground has been connected to fan inputs 1011A, 1012A, 1107A, 1111A to effect Nixie tube display. If display differential relay 1002 is locked operated for any reason, ground through contacts 1106–i, diode 1159, and contacts 1002–c would release relay 1002.

OPERATOR EFFECTS DISPLAY OF DIGITS

To effect Nixie tube display of digits prepared by the digit bins, the operator depresses and releases the CLG NO display key on the control panel (FIG. 9) and ground is forwarded via path 104B and lead 1021, diode 1069, and the lower winding of differential display relay 1002 to battery. Relay 1002 operates and locks to ground over its contacts 1002–d and prepares circuits for its own release from battery through its upper winding and contacts 1002–a. Relay 1002 at its contacts 1002–b, operates relay 1040 which, at its contacts 1040a to 1040g and leads 1011A, 1012A, 1107A and 1111A provides ground to the input of each of the fan digit bins 1–7 to effect the energization of the Nixie tube displays on the display panel of FIG. 9.

DISPLAY RELEASE

If the operator subsequently momentarily depresses any of the non-locking keys KP CD, KP SPL, KP RATE, KP NFY, KP GST, ST (FIG. 9) signaling via path 104A, comparator 105, and path 105C results in a ground pulse (FIG. 10) on a corresponding lead 1022–1041 (FIG. 10) through a diode 1061–1065 on reset lead 1070, contacts 1002–a, and the upper winding of relay 1002 to battery which effects the release of relay 1002. If the operator had depressed any of the non-locking keys CLD NO display key, SPL NO display key or RATE display key (FIG. 9), signalling via path 104A would have resulted in a ground pulse lead 1045, 1046 or 1047 (FIG. 10) through diode 1066, 1067 or 1068 on reset lead 1070 and to release of relay 1002 as described. (Depression of CDD NO, SPL NO, and RATE keys also results in ground pulses over respective leads in path 104A to the comparator 105A for comparison purposes.)

OPERATOR KEYS IN DIGITS

Operator depresses KP CG Key

When the operator momentarily depresses the KP CG key (FIG. 9) preparatory to keying the calling number signalling is effected over path 104A, comparator 105, and path 105C to FIG. 10, and ground is momentarily removed from lead 1029, momentarily releasing relay 1006 which releases all digit bin relays which might have been operated over its contacts 1006–a and 1006–b; and over its contacts 1006–C holds open the circuit of relay 1001. Relay 1006 is fast operating, and pulls up fast after the pulse disappears. In addition, a ground pulse is placed on lead 1030 to operate START relay 1001 which prepares to lock over its contacts 1001–c. When the operator releases the KP CG key, ground disappears from lead 1030 and reappears on lead 1029, reoperating relay 1006. Relay 1001 is slow to release and locks over contacts 1001–c, 1051–b, 1005–g . . . 1106–g, lead 1054, contacts 1051–a and 1006–c to ground.

Relay 1001 at its contacts 1001–a operates display relay 1002 which locks over its contacts 1002–d. Relay 1002 at its contacts 1002–b operates slave relay 1040 which in turn is effective at its contacts 1040–a to 1040–g to provide ground individually to the inputs of contact fans of digit bins 1–7 designated 1011–1111 (FIGS. 10, 11).

OPERATOR KEYS FIRST DIGIT

When the operator effects the depression of the first one of the digit keys of the group 911 (FIG. 9) a ground pulse is placed on its corresponding one or two of the 1, 2, 4, 7 code leads designated 1025, 1026, 1027, 1028 in path 104B. This ground pulse through the rectifiers of the group 1013R, 1014R, 1015R, 1016R and lead 1038 (FIG. 10) and contacts 1004–e, operates odd relay 1003 in series with counting relay 1005, as previously described. Counting relay 1005 at its contacts 1005–g releases start relay 1001.

Ground on the one or two code leads of the group 1025–1028 through contacts a–d of relays 1003 and 1005 selectively operate relays of the group 1007–1010 of digit-1 bin which lock to ground through contacts 1006–a, selectively lighting the Nixie tube 933.

When the ground pulse (or pulses) disappears, relay 1003 releases, but relay 1005 remains locked up as previously described.

OPERATOR KEYS SECOND DIGIT

Relays 1004 and 1001 operate and lock, and relay 1005 releases. Relays of digit bin 2 are operated and locked, and the second Nixie tube 934 is selectively energized as described earlier.

OPERATOR KEYS THIRD THROUGH SEVENTH DIGITS

Relays 1102 to 1106 (and 1107) become operated as previously described, in turn operating the digit bin relays which selectively light the remaining Nixie tubes 935–939 (FIG. 9).

Relay 1106 connects ground over contacts 1106–i, diode 1159, lead 1057, contacts 1002–c, and the upper winding of differential relay 1002 to battery, releasing relay 1002. The release of relay 1002 in turn opens contacts 1002B to release relay 1040 which removes ground from the digit bin contact fans thereby extinguishing the Nixie tubes 935–939.

REMOVING DISPLAY

It should be observed that the Nixie display can be extinguished in several ways enter different circumstances. The automatic removal of the display with the automatic release of relay 1002 at the end of the keying of the seven digits of the calling number has just been described. Subsequently the operator can effect the display of the calling number by depressing the CLG NO display key on the control panel (FIG. 9) which results in a ground pulse over path 104B and lead 1021 through diode 1069 to operate display relay 1002 which locks.

As can be observed by a consideration of the path through contacts 1002–a, a ground pulse through these contacts will release the display relay 1002 and thereby remove the display whenever:

(1) A ground pulse appears on lead 1022 as a result of the operator depressing the KP CD key to prepare for keying the called number.

(2) A ground pulse appears on lead 1023 as a result of the operator depressing the KP SPL key to prepare for keying a special number.

(3) A ground pulse appears on lead 1024 as a result of the operator depressing the KP RATE key to prepare for keying the rate.

(4) A ground pulse appears on lead 1037 as a result of the operator depressing the KP NFY key to prepare for inserting timing information.

(5) A ground pulse appears on lead 1041 as a result of the operator depressing the KP GUEST key to prepare for keying the calling number of a hotel guest, etc.

(6) A ground pulse appears on lead 1045 as a result of the operator depressing the CLD NO key to prepare display of the called number.

(7) A ground pulse appears on lead 1046 as a result of the operator depressing the SPL NO key preparatory to display of a special number.

(8) A ground pulse appears on lead 1047 as a result of the operator depressing the RATE key preparatory to display of the rate.

As an alternative arrangement, the operator can be trained by using certain of the loops in 913 with the other "loop" function in training the operator with the loop 914. For example, the three right loops could be used for "loop" function in training the operator with the loop at the left incorporating 920, 921, 960, and 914. For example, the ACS key designated A could be used for the start key 920; the hold key E for the stop key 921; the CLD key for the MAN key 960; and the time lamp Q for the ERROR lamp 914. This could be accomplished by the plug and jack means which plug the trainer system into a regular TSD board instead of the system.

In implementing the concepts of the invention, other alternative arrangements are also possible in that there exist modulation methods alternative to frequency shift which would accomplish the purpose. It is well-known in the art that for data transmission, in particular amplitude modulation with vestigial side band means and phase shift modulation has proven very effective for data transmission over voice band channels. In the described implementation of the invention frequency modulation (frequency shift keying) was however chosen, as the available bit rate with this modulation method well satisfied the requirements; and this scheme in addition appeared to provide a good solution with regard to reliability of operation, complexity and cost.

It should be appreciated also that the concepts of the invention might be used in training operators in systems other than telephone systems.

What is claimed is:

1. In an operator training system for automatic telephone systems having a magnetic tape player including a magnetic tape having the exact sequence for training a trainee for different types of incoming calls at a toll service board recorded on the magnetic tape including one channel having signals recorded in a frequency shift keying code to provide program information and a second channel having recorded voice frequencies for use with said program, a frequency shift keying receiver unit, means connecting the frequency shift signals output from said one channel on said magnetic tape player to said frequency shift keying receiver unit, a comparator unit having means for providing a memory of the program steps indicated by said frequency shift keying code signals, a toll service training desk, an interface unit having register means responsive to said frequency shift keying code signals including a first means controlled by said register means for enabling said memory in said comparator unit to register the proper key to be depressed by the trainee, and a second means controlled by said register means to selectively light the lamps on said toll service training board to provide an indication to the trainee of the type of incoming call to be processed.

2. An operator training system as set forth in claim 1 in which said toll service board includes keys for simulating the processing of a call, means for sending signals to said comparator means which identifies each key as depressed, and means in said comparator means for advancing said tape only in response to receipt of signals which include depression of the key which is identified in said memory.

3. An operator training system as set forth in claim 2 which includes error detection means responsive to a signal indicating depression of a key other than the key identified by said memory for said step, and error indicating means on said toll service board controlled by said error detection means to indicate such error to the operator.

4. An operator training system as set forth in claim 3 which includes a headset for the operator, and in which said tape is operative in certain of said advances to provide voice signals to the operator over said headset which are related to the call identified by the lighted lamps.

5. An operator training system as set forth in claim 1 in which said lamps are divided into a plurality of groups, and in which said program information is recorded in segments, each of which segments includes at least address information and data information, and in which said register means includes an address register for use in selecting the group of lamps from said plurality which is indicated by the address, and a data register for use in selecting a lamp from the selected lamp group.

6. An operator training system as set forth in claim 5 in which each segment includes a sync signal, and said interface includes sync detector means for detecting the presence of a sync signal, and means for enabling said address and said data register means only in response to detection of the sync signal.

7. An operator training system as set forth in claim 5 in which said first means includes a plurality of shift registers, gate means for each of said registers, and a plurality of relay drivers for enabling said memory, said gate means for a shift register being operative in response to a predetermined address in said address register to enable the associated shift register to receive data information from said data register, and means in said shift register to enable the one of the relay drivers in the associated group which is indicated by said data information.

8. An operator training system as set forth in claim 5 in which said second means includes a plurality of shift registers, gate means for each of said shift registers, and a plurality of lamp drivers for each register, each of which lamp drivers enables a different lamp on said board, said gate means for a shift register being responsive to a predetermined address in said address register to enable its associated shift register to receive data information from said data register, and means in said shift register to enable the one of the lamp drivers in the associated group which is indicated by said data information.

9. An operator training system as set forth in claim 1 which includes a register unit for storing information including directory numbers related to a call in progress, and a keyset for use by said operator in storing directory numbers in said register unit.

10. An operator training system as set forth in claim 9 in which said toll service board includes a display board, and key means operable by the trainee to effect selective display of the information stored in said register unit on said display board.

11. An operator training system as set forth in claim 9 which includes a third means controlled by said register means to effect storage of the calling number, called number and charge, time and rate information which is provided by said tape signals in said register unit.

12. An operator training system as set forth in claim 9 in which said register unit includes a calling number register, a called number register, a special number register, a guest register and time, rate and charge registers connected to said toll service board.

13. An operator training system as set forth in claim 9 in which said register unit is operative subsequent to storage of calling and called area directory numbers therein by the operator to provide an advance signal for the tape player.

14. An operator training system as set forth in claim 9 in which said register unit includes a plurality of register circuits, each of which includes a storage bin for each digit of calling and called area directory numbers transmitted thereto for storage purposes, and counting means for making the value of each digit as received in the corresponding storage bin.

15. An operator training system as set forth in claim 14 in which said toll training board has visual display means, and which includes key means on said board for effecting a display of the digits in the various storage bins on said visual display means.

16. An operator training system as set forth in claim 1 which includes a register unit for storing a directory number, and in which said comparator means includes means for detecting depression of the proper key by the trainee for a given step, and means for preparing said register unit to store a directory number provided by said trainee responsive to detection of the depression of a predetermined key, and means for simultaneously illuminating a lamp indicating to the trainee that such keying may be initiated.

17. An operator training system as set forth in claim 2 in which a plurality of said keys are operated simultaneously to provide a proper response, and in which said comparator means includes means operative only in response to simultaneous operation of both keys to advance the tape program.

18. An operator training system as set forth in claim 2 in which one of said keys is a locking key for use in busy verification which is to be released immediately after each test, and in which said comparator includes a first relay operated by said first means whenever a busy verification test is to be made, a second relay which is operated only if the trainee depresses said locking key, a third holding relay operated only when said first and second relays are operated, tape program advance means for advancing said program responsive to simultaneous operation of said first, second and third relays, said first means disabling said first relay responsive to said tape program advance and means controlled by release of said locking key and said second relay to reenable said program advance means and to disable said third relay.

References Cited

UNITED STATES PATENTS

| | | | |
|---|---|---|---|
| 3,238,644 | 3/1966 | Hayes | 35—14X |
| 3,261,111 | 7/1966 | Johnston et al. | 35—14X |

WILLIAM H. GREIB, Primary Examiner